(12) United States Patent
Ikeda et al.

(10) Patent No.: US 6,829,050 B2
(45) Date of Patent: *Dec. 7, 2004

(54) OPTICAL DEVICE PROVIDED WITH A RESIN THIN FILM HAVING A MICRO-ASPERITY PATTERN AND MANUFACTURING METHOD AND APPARATUS OF THE OPTICAL DEVICE

(75) Inventors: Masaaki Ikeda, Kyoto (JP); Akihiro Funamoto, Kyoto (JP); Motohiko Matsushita, Kyoto (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 341 days.

This patent is subject to a terminal disclaimer.

(21) Appl. No.: 10/054,088

(22) Filed: Jan. 22, 2002

(65) Prior Publication Data

US 2002/0098257 A1 Jul. 25, 2002

(30) Foreign Application Priority Data

Jan. 22, 2001 (JP) .................................. 2001-013625

(51) Int. Cl.⁷ ............................. G01B 11/00; H01J 9/02; H01J 11/02
(52) U.S. Cl. ..................... 356/400; 430/320; 425/374; 264/1.6; 264/2.2; 428/148
(58) Field of Search ............................ 430/320; 428/148, 428/409; 356/400; 425/374, 385; 264/1.6, 2.2, 85, 102, 1.34, 1.36; 359/618, 619

(56) References Cited

U.S. PATENT DOCUMENTS 5,071,597 A * 12/1991 D'Amato et al. .......... 264/1.34
5,672,410 A * 9/1997 Miekka et al. .............. 428/148

FOREIGN PATENT DOCUMENTS

JP 2000-348607 * 12/2000 ............. H01J/9/02

OTHER PUBLICATIONS

Patent Abstracts of Japan, Publication No.:2000–267088, Publication Date:Sep. 29, 2000, 3 pages.

* cited by examiner

Primary Examiner—Gregory J. Toatley, Jr.
Assistant Examiner—Layla Lauchman
(74) Attorney, Agent, or Firm—Osha & May L.L.P.

(57) ABSTRACT

A cylindrical embossment roll whose outer circumferential surface is formed with a micro-asperity pattern is prepared. A substrate is coated with a thin resin film. The substrate is held by a transfer stage, and a micro-asperity pattern is formed on the thin resin film by pressing the outer circumferential surface of the embossment roll against the thin resin film with a pressurizing mechanism while rolling the embossment roll on the thin resin film.

21 Claims, 17 Drawing Sheets

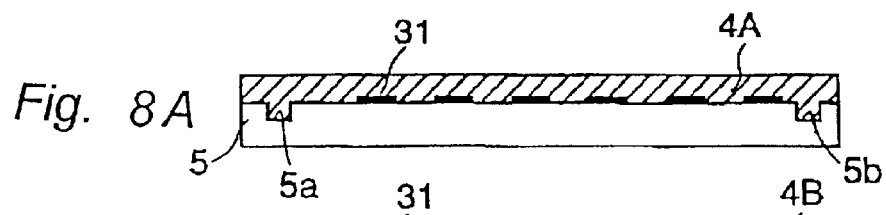
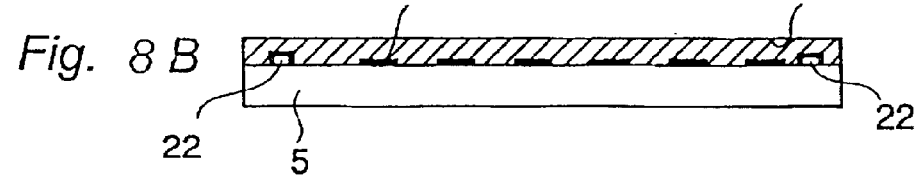
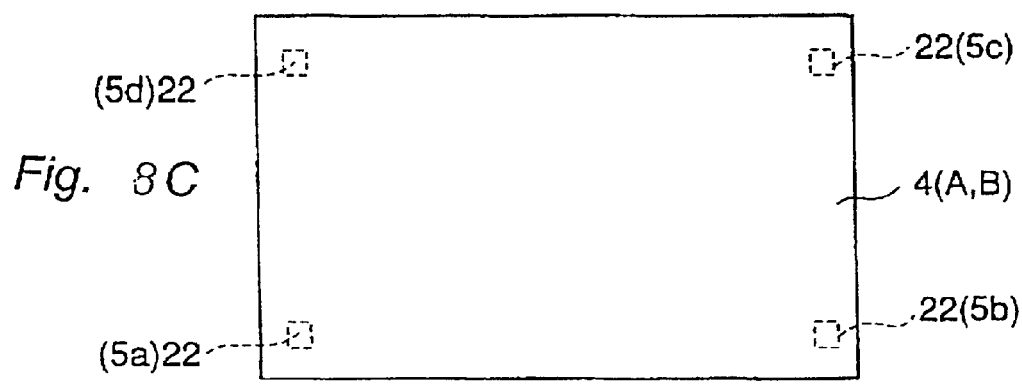
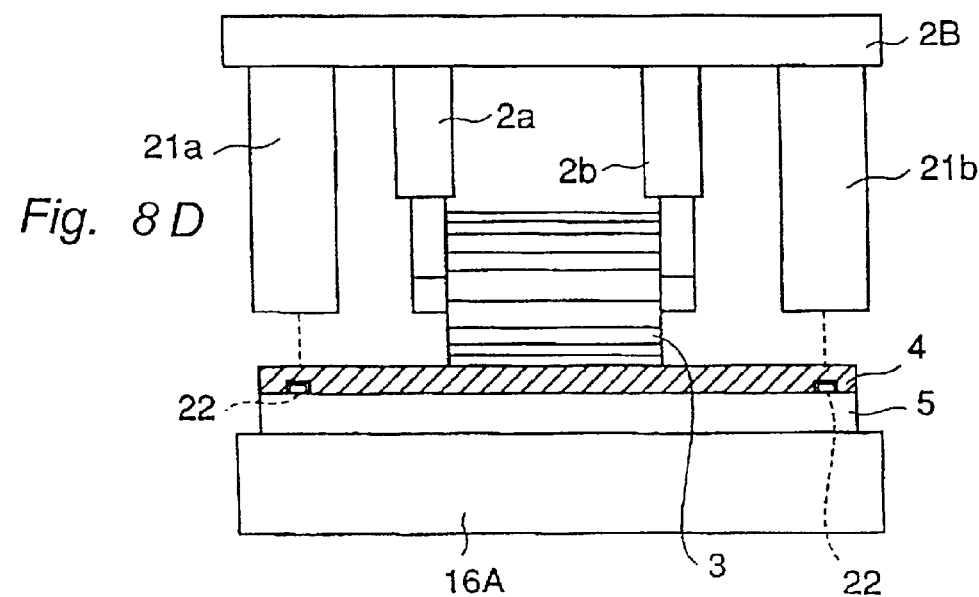

OPTICAL DEVICE PROVIDED WITH A RESIN THIN FILM HAVING A MICRO-ASPERITY PATTERN AND MANUFACTURING METHOD AND APPARATUS OF THE OPTICAL DEVICE

BACKGROUND OF THE INVENTION

1. Field of the Invention

The present invention relates to an optical device provided with a thin resin film having a micro-asperity pattern, a manufacturing method, and an apparatus of the optical device.

2. Description of the Related Art

Nowadays, liquid crystal display devices are increasingly applied to personal computers, TV receivers, word processors, video equipment, etc. To increase the functionality and reduce the size, power consumption, cost, etc. of such electronic equipment, reflection-type liquid crystal display devices are being developed that display an image by reflecting external light instead of using a backlight.

FIG. 15 shows an example of such reflection-type liquid crystal display devices. A reflection plate 1 is disposed under a counter substrate 28 that is composed of a transparent electrode facing a liquid crystal layer 27, a color filter layer formed over the transparent electrode, and a surface glass substrate disposed over the color filter layer. The reflection plate 1 is used to increase the viewing angle of image display of the liquid crystal display device by diffuse-reflecting light coming from the counter substrate 28.

For example, reflection plates used in such reflection-type liquid crystal display devices are formed by the following melting method. A photosensitive resin material is applied, by spin coating or the like, to the surface of a glass or resin substrate or the surface of a structure in which TFT transistors, liquid crystal driving elements, etc. are formed on such a substrate. The photosensitive resin layer is processed by photolithography so as to have asperities that are generally rectangular in cross-section, and then it is subjected to a heat treatment, whereby a smooth surface is formed by surface tension etc.

A roll embossment method is also known. In this method, a melted resin is applied to the surface of a micro-asperity pattern stamper that is provided on the outer circumferential surface of an embossment roll. As the resin sheet formed with an asperity pattern is cooled and set and also pealed off the stamper surface, it is contact-bonded to the surface.

Incidentally, a method for manufacturing an ideal micro-asperity pattern is required to satisfy the following and other conditions: 1) various three-dimensional shapes can be formed and arranged regularly or randomly; 2) a surface shape is not made obtuse by heating and the processing accuracy is high; 3) a thin film having a uniform planar shape can be formed; 4) a wide selection range of resin materials is available; 5) the cycle time is short and the mass-productivity is high.

The melting method can easily form a thin film because a resin is formed on a substrate by spin coating. However, since the melting method makes use of the phenomenon that a surface shape of a resin layer is made obtuse by a heat treatment, it cannot realize acute angles nor long planar shapes. It can realize only a narrow variety of three-dimensional shapes.

The melting method has additional problems. Since the melting conditions depend on the asperity shape that is formed by photolithography, the shape dispersion tends to be large and the processing accuracy is low. A number of manufacturing steps are needed and hence the cycle time is long. The degree of freedom of selection of photosensitive materials is low.

In the roll embossment method, since the resin application step and the transfer step can be combined into a single step, the cycle time of formation of a micro-asperity pattern is short. Since the stamper is produced in advance, a desired three-dimensional shape can be realized accurately in a stable manner. Any resin material can be used as long as it is meltable; that is, the degree of freedom of selection of resin materials is high. However, the thickness of a resin sheet is one order greater than in the melting method; it is difficult to form a thin film that is as thin as several micrometers.

In reflection-type liquid crystal display devices, no backlight is used and a reflection layer is formed on an asperity pattern layer to introduce external light to a liquid crystal layer. A reflection film having the asperity pattern layer is disposed under color filters enclosed by a block matrix, and liquid crystal driving elements are disposed between the reflection film and the color filter layer or under the reflection film.

If a registration error occurs between the color filter layer and the asperity pattern, light that should enter one of R, G, and B color filters may enter a color filter adjacent to it or a sufficient quantity of light may not enter color filters because of interruption by the black matrix, as a result of which a moire may occur and lower the legibility. If a registration error occurs between the color filter layer and the liquid crystal driving elements, intended liquid crystal portions cannot be driven and hence an intended image cannot be formed.

To avoid the above problems, the reflection film having the asperity pattern is provided with asperity pattern layer alignment marks and the liquid crystal driving elements are disposed by using those alignment marks as references. On the other hand, the color filter layer is provided with filter layer alignment marks. The reflection layer and the color filter layer are registered with each other by locating the two kinds of alignment marks at the same positions.

However, conventionally, as shown in FIGS. 23A–23C, the liquid crystal driving elements 31 are disposed in two ways: under the reflection film 26 (see FIG. 23B); and over the reflection film 26 (see FIG. 23C).

In the arrangement shown in FIG. 23B, since the liquid crystal driving elements 31 are disposed under the reflection layer 26, to perform registration between the reflection layer 26 and the color filter layer 35 it is necessary to remove parts of the asperity pattern layer 4 corresponding to the alignment marks 22 and thereby enable visual or optical detection of the alignment marks 22.

In the arrangement shown in FIG. 23C in which the liquid crystal driving elements 31 and the alignment marks 22 are disposed on a transparent planarization layer 45, it is necessary to form the planarization layer 45 separately, to dispose the alignment marks 22 on the surface of the planarization layer 45 so as to correspond to respective alignment marks 4a of the asperity pattern layer 4, and dispose the liquid crystal driving elements 31 also on the surface of the planarization layer 45. This results in a problem that the number of members and manufacturing steps are large.

SUMMARY OF THE INVENTION

The present invention has been made in view of the above circumstances in the art, and an object of the invention is therefore to provide an optical device having an asperity pattern that can be formed as a thin film with high accuracy in any of various three-dimensional shapes, as well as to provide a manufacturing method and apparatus of such an optical device. In this specification, "micro-asperity pattern" is a generic term of asperity shapes that develop one-dimensionally or two-dimensionally and is 0.1 μm to hundreds of micrometers in depth and arbitrary in width, length, and shape. Also, "reflection-type liquid crystal display device" is a generic term of devices in which a liquid crystal is sealed between a transparent counter substrate having a transparent electrode and an active matrix substrate having a reflection surface that is provided with a surface micro-asperity pattern.

The invention provides a manufacturing method of an optical device, comprising the steps of preparing a cylindrical die unit an outer circumferential surface of which is formed with a micro-asperity pattern; preparing a substrate that is coated with a thin resin film; holding the substrate by a transfer stage; and forming a micro-asperity pattern on the thin resin film by pressing the outer circumferential surface of the die unit against the thin resin film with pressurizing means while rolling the die unit on the thin resin film.

In this manufacturing method, a micro-asperity pattern is formed on the thin resin film that is formed on the substrate by pressing, against the thin resin film, the cylindrical die unit the outer circumferential surface of which is formed with a micro-asperity pattern. More specifically, the substrate is held by the transfer stage and the transfer stage is moved while the outer circumferential surface of the die unit is pressed against the thin resin film by the pressurizing means. A micro-asperity pattern is formed on the thin resin film as the die unit rolls on the thin resin film.

For example, as shown in FIG. 1, recesses 3a of an embossment roll 3 are pressed against the surface of a thin resin film 4. Therefore, even if air bubbles exist inside the thin resin film 4, they are pushed and moved by the recesses 3a of the embossment roll 3 in the direction opposite to the moving direction of the thin resin film 4 and are broken by projections 3b of the embossment roll 3, whereupon the air goes out of the thin resin film 4. This reduces the probability of a phenomenon that a resulting asperity pattern is deformed by air bubbles remaining in the thin resin film 4.

It is desirable that the temperature of a room is set lower than a melting temperature of the thin resin film, and that at least one of the die unit and the transfer stage be heated while control is so made that the temperature of the thin resin film is lower than its heat decomposition temperature. With this technical measure, since the modulus of elasticity of the thin resin film can be decreased and its flowability can be increased by heating it, the loads necessary for the processing such as the pressure are decreased, which makes it possible to manufacture an optical device having an accurate micro-asperity pattern.

Asperity patterns can be arranged with a desired layout by performing the operation of rolling the die unit on the thin resin film a plurality times.

It is an effective measure to adjust an angular deviation, from the rotation axis of the die unit, of a line connecting two alignment marks of the thin resin film that are located on both sides of the rotation axis of the die unit by rotating the substrate relative to the die unit in a state that the substrate is held by the transfer stage directly or indirectly.

With this technical measure, the line connecting the two alignment marks can be rotated with respect to the rotation axis of the die unit by rotating the substrate together with moving mechanisms for moving the transfer stage in the X-axis and Y-axis directions in a state that the substrate is held by the transfer stage directly.

Where the substrate is held by the transfer stage indirectly, for example, the substrate is held by the transfer stage with a substrate rotation direction adjustment mechanism 16 interposed in between (see FIG. 7), the substrate can be rotated by means of the substrate rotation direction adjustment mechanism 16. Therefore, the line connecting the two alignment marks can be rotated with respect to the rotation axis of the die unit.

This technical measure makes it possible to set the angle between the line connecting the two alignment marks and the rotation axis of the die unit at a predetermined angle such as 0° or 90°. The substrate side and the die unit side can be registered with each other.

It is an effective measure to form a micro-asperity pattern on the thin resin film in an inert gas or a low-pressure atmosphere having a pressure that is lower than atmospheric pressure. With this technical measure, since the air is exhausted in advance from a chamber that accommodates a manufacturing apparatus of the optical device, oxygen and impurities contained in the air are also exhausted from the chamber and a micro-asperity pattern can be formed in a clean inert gas atmosphere. This prevents oxidation or change in quality of the thin resin film as well as a phenomenon that impurities stick to the thin resin film during formation of a micro-asperity pattern and are finally fixed to the micro-asperity pattern formed. This contributes to increase of the production yield of the optical device.

Particularly where the pressure inside the chamber is lowered, no air is trapped between the die unit and the thin resin film and hence a micro-asperity pattern that is free of air bubbles can be formed. During pressurization, air bubbles act as dampers and hence necessitates increase of the pressurizing force. The elimination of air bubbles allows reduction of the pressurizing force, as a result of which the residual stress of a micro-asperity pattern can be reduced. This contributes to increase of the production yield of the optical device.

The thin resin film may be made of a thermoplastic material. A thermoplastic resins becomes flowable and hence can be shaped when heated, and solidifies when cooled. A micro-asperity pattern can be formed by pressing, with a stamper, a thin resin film on the substrate that has become flowable by heating and then cooling the thin resin film by either natural cooling at room temperature or forced cooling.

The thin resin film may be made of a thermosetting resin. A thermosetting resin is set by continuing to heat it from a liquid state or a solid state. A micro-asperity pattern can be formed by coating the substrate with a liquid thin resin film and then pressing it with a stamper while heating it.

It is desirable that the die unit have a portion having an inverted shape of the shape of an intended alignment mark that will serve as a positional reference when an optical element is disposed at a prescribed position with respect to the substrate, and that the alignment mark be press-formed on the thin resin film together with a micro-asperity pattern.

With this technical measure, since the same die unit is formed with the micro-asperity pattern and the alignment mark portion, an alignment mark can be formed accurately on the thin resin film together with a micro-asperity pattern so that they have a prescribed positional relationship, whereby the position of the micro-asperity pattern can be set accurately with respect to the optical component.

The invention also provides a manufacturing apparatus of an optical device, comprising a transfer stage for holding a substrate that is coated with a thin resin film; a cylindrical die unit an outer circumferential surface of which is formed with a micro-asperity pattern; a moving mechanism for moving the transfer stage in a direction that crosses a rotation axis of the die unit; and a pressurizing mechanism for pressing the outer circumferential surface of the die unit against the thin resin film in such a manner that the die unit can rotate about the rotation axis, wherein a micro-asperity pattern is formed on the thin resin film as the die unit rolls on the thin resin film while being pressed against the thin resin film.

In this manufacturing apparatus, the die unit rolls on the thin resin film while the outer circumferential surface of the die unit is pressed against the thin resin film by the pressurizing mechanism that is provided in such a manner that the die unit can rotate about its rotation axis. Either the thin resin film or the die unit may be moved.

In this manufacturing apparatus, a micro-asperity pattern is formed by pressing the cylindrical die unit whose outer circumferential surface is formed with the micro-asperity pattern against the thin resin film formed on the substrate. Therefore, even if air bubbles exist inside the thin resin film 4, they are pushed and moved by recesses of the asperity pattern of the die unit in the direction opposite to the moving direction of the thin resin film (if the thin resin film is moved) or in the moving direction of the die unit (if the die unit is moved) and are broken by projections of the asperity pattern of the die unit, whereupon the air goes out of the thin resin film. This reduces the probability of a phenomenon that a resulting asperity pattern is deformed by air bubbles remaining in the thin resin film.

It is desirable that the die unit comprise a stamper member for press-forming a micro-asperity pattern on the thin resin film and a roll body for holding the stamper member. This technical measure makes it possible to roll the die unit on the thin resin film.

It is an effective measure that the die unit comprises a stamper member for press-forming the micro-asperity pattern on the thin resin film, a roll body for holding the stamper member, and an elastic member interposed between the stamper member and the roll body.

With this technical measure, the elastic member absorbs manufacturing errors such as undulation, warping, and surface roughness of the substrate, the stamper member, the roll body, etc. and thereby increases the processing accuracy of a micro-asperity pattern.

It is an effective measure that the manufacturing apparatus further comprises a heating unit for heating the die unit and the transfer stage, and a temperature control section for controlling the heating unit. This technical measure uniformizes the material characteristics of the thin resin film and increases the processing accuracy.

It is desirable that the manufacturing apparatus further comprise a rotation axis direction moving mechanism for moving the transfer stage in the direction of the rotation axis of the die unit. This technical measure makes it possible to adjust the movement position of the die unit.

It is an effective measure that the manufacturing apparatus further comprises a rotary moving mechanism for rotating the substrate in a plane that is located under the die unit and is parallel with the rotation axis of the die unit.

One possible structure is such that the rotary moving mechanism is provided over the transfer stage and the substrate is held by the rotary moving mechanism. Another possible structure is such that the rotary moving mechanism is provided under the transfer stage and the substrate is held by the transfer stage. This technical measure makes it possible to adjust the micro-asperity pattern forming direction with respect to the die unit moving direction by rotating the substrate in a plane that is located under the die unit and is parallel with the rotation axis of the die unit.

It is an effective measure that the manufacturing apparatus further comprises at least one alignment mark observation optical device provided in the pressurizing mechanism, for observing at least one alignment mark formed on the substrate.

It is also an effective measure that the manufacturing apparatus further comprises at least one alignment mark observation optical device provided under the substrate, for observing at least one set of a first alignment mark formed on the substrate and a second alignment mark formed on the die unit. Where the alignment mark observation optical device is provided under the substrate, it may be disposed in the transfer stage or the rotary moving mechanism or disposed so as to bridge the transfer stage and the rotary moving mechanism.

The above two technical measures make it possible to form a micro-asperity pattern with high positional accuracy.

The invention provides another manufacturing apparatus of an optical device, comprising a transfer stage for holding a substrate that is coated with a thin resin film; a cylindrical die unit an outer circumferential surface of which is formed with a micro-asperity pattern; a pressurizing mechanism for pressing the outer circumferential surface of the die unit against the thin resin film in such a manner that the die unit can rotate about a rotation axis thereof, a moving mechanism for moving one of the transfer stage and the die unit; an airtight chamber for accommodating at least the transfer stage, the die unit, the pressurizing mechanism, and the moving mechanism; and exhausting means for exhausting a gas from the airtight chamber prior to an operation that a micro-asperity pattern is formed on the thin resin film as the die unit rolls on the thin resin film while being pressed against the thin resin film.

In this manufacturing apparatus, since the exhausting means exhausts a gas from the airtight chamber prior to a micro-asperity pattern forming operation in which the die unit rolls on the thin resin film, oxygen and impurities contained in the air are also exhausted from the airtight chamber and a micro-asperity pattern can be formed in a clean inert gas atmosphere. This prevents oxidation or change in quality of the thin resin film as well as a phenomenon that impurities stick to the thin resin film during formation of a micro-asperity pattern and are finally fixed to the micro-asperity pattern formed. This contributes to increase of the production yield of the optical device.

Particularly where the pressure inside the airtight chamber is lowered, no air is trapped between the die unit and the thin resin film and hence a micro-asperity pattern that is free of air bubbles can be formed. During pressurization, air bubbles act as dampers and hence necessitates increase of the pressurizing force. The elimination of air bubbles allows reduction of the pressurizing force, as a result of which the residual stress of a micro-asperity pattern can be reduced. This contributes to increase of the production yield of the optical device.

The invention also provides an optical device comprising a substrate; and a thin resin film formed on the substrate, a top surface of the thin resin film being formed with a micro-asperity pattern and an alignment mark that will serve as a positional reference when an optical component is disposed at a prescribed position with respect to the substrate, the micro-asperity pattern and the alignment mark being formed by rolling, on an original resin film, a cylindrical die unit an outer circumferential surface of which is formed with a micro-asperity pattern and a portion having an inverted shape of a shape of the alignment mark while pressing the die unit against the original thin resin film.

This optical device is manufactured by using the die unit that is formed with the portion having the inverted shape of the shape of an alignment mark that will serve as a positional reference when an optical component is disposed at a prescribed position with respect to the substrate. Since the same die unit is formed with the micro-asperity pattern and the alignment mark portion, an alignment mark can be formed accurately on the thin resin film together with a micro-asperity pattern so that they have a prescribed positional relationship. The optical device makes it possible to set the position of the micro-asperity pattern accurately with respect to the optical component.

It is desirable that the alignment mark have a first portion that allows observation light incident on the alignment mark to go to detecting means and a second portion that does not.

With this technical measure, a light portion of an alignment mark of the optical component and the second portion of the alignment mark of the thin resin film can easily be registered with each other by locating them adjacent to each other or laying them one on another. The second portion may be such as to change the optical path of part of the observation light incident on the second portion so that the part of the observation light does not reach the detecting means. The optical path changing means may be such that a medium boundary surface is located on the optical path of incident light so as to form a proper angle with the optical path. In this manner, the optical path of incident light can easily be changed through refraction or reflection.

BRIEF DESCRIPTION OF THE DRAWINGS

FIGS. 8A–8D illustrate the main part of the asperity pattern forming apparatus according to the seventh embodiment having alignment mark observation devices over a reflection plate;

DESCRIPTION OF THE PREFERRED EMBODIMENTS

Preferred embodiments of the present invention will be hereinafter described with reference to the accompanying drawings. The dimensions, materials, shapes, their relative arrangements, etc. of components used in the embodiments are just examples and are not intended to restrict the scope of the invention unless there is a specific statement to the contrary.

Figure 1:
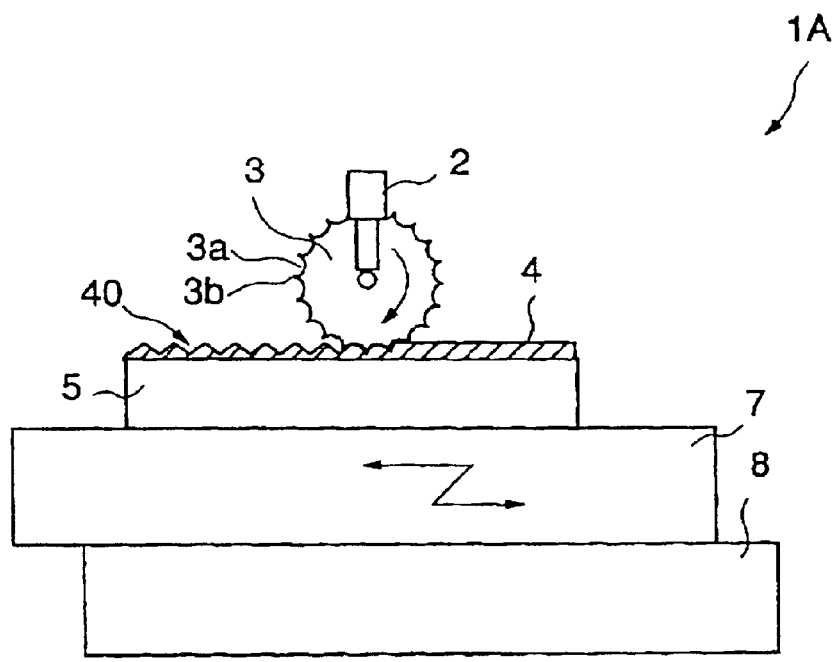
FIG. 1 illustrates the main part of an asperity pattern forming apparatus according to a first embodiment of the invention for forming an asperity pattern on a thin resin film.

FIG. 1 illustrates the main part of an asperity pattern forming apparatus according to a first embodiment of the invention for forming an asperity pattern on a thin resin film.

In FIG. 1, polished on both sides, an opaque or transparent substrate 5 made of ceramics, glass, plastics, aluminum, molybdenum, silicone, or the like has prescribed levels of undulation, warping, and flatness. Warping having curvature of several centimeters or less is allowable. In the case of a substrate measuring 550 mm×650 mm, warping of 400 µm or less is allowable. The undulation is so set as to have curvature of 4 µm or less, and the flatness is so set the asperity has curvature of tens of nanometers or less. The substrate 5 may be one on which electronic devices such as liquid crystal driving elements are arranged in array form.

A thin film 4 made of an acrylic resin (PMMA), polyimide (PI), polyamideimide (PAI), polyetherimide (PEI), or the like is formed on the substrate 5 by spin coating at a thickness of about 0.1–100 µm. An embossment roll 3, which is disposed above the thin resin film 4, is made of a metal material such as Ni, Al, SUS, or Cu, ceramics, glass, silicone, resin, or the like. The roller-like surface of the embossment roll 3 is formed with an asperity pattern that was formed by direct carving, etching, printing, or the like. The thin resin film 4 may be formed by slit coating, spray coating, or the like rather than spin coating. Resins other than the ones mentioned above, such as a novolac resin and a phenol resin, may be used as a material of the thin resin film 4.

The embossment roll 3 for shaping the thin resin film 4 while being pressed against it is rotatably held by a pressurizing mechanism 2. The apparatus is so configured that the pressurizing mechanism 2 can produce pressure of several megapascals to thousands of megapascals. The pressurizing mechanism 2 produces pressure using a hydraulic mechanism. Alternatively, a pneumatic mechanism, reaction force of a high-elasticity spring, restoring force of a shape memory alloy, or the like can be used.

A transfer stage 7 can be moved in the right-left direction on a moving mechanism 8 by a linear actuator that is provided in the moving mechanism 8. Instead of the linear actuator, a hydraulic cylinder, a pneumatic cylinder, or a combination of a motor and a chain (or a belt) may be used.

The substrate 5 is vacuum-absorbed on the transfer stage 7. Alternatively, the substrate 5 may be held by electrostatic absorption or by some other holding means.

In the apparatus according to the first embodiment that is configured as described above, when the substrate 5 is moved from right to left in FIG. 1 in the state that it is absorbed on and held by the transfer stage 7, the embossment roll 3 is rotated clockwise while the asperity pattern of the embossment roll 3 is pressed against the thin resin film 4, whereby the top surface of the thin resin film 4 is shaped into an asperity pattern 40.

Although in the first embodiment the thin resin film 4 is moved in one direction, it goes without saying that the pressurizing mechanism 2 may be moved in the opposite direction.

In the first embodiment, the embossment roll 3 (specifically, its recesses 3a) is pressed against the surface of the thin resin film 4. Therefore, even if air bubbles exist inside the thin resin film 4, they are pushed and moved by the recesses 3a of the embossment roll 3 in the direction opposite to the moving direction of the thin resin film 4 and are broken by projections 3b of the embossment roll 3, whereupon the air goes out of the thin resin film 4. This reduces the probability of a phenomenon that the asperity pattern 40 is deformed by air bubbles.

Figure 2:
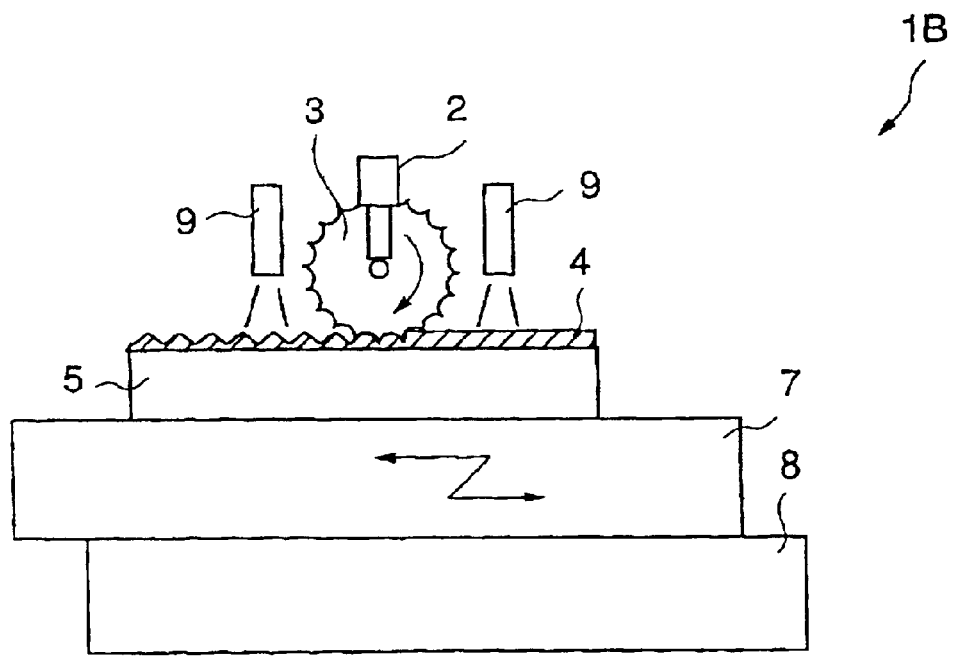
FIG. 2 illustrates the main part of an asperity pattern forming apparatus according to a second embodiment for forming an asperity pattern on a thin resin film.

FIG. 2 illustrates the main part of an asperity pattern forming apparatus according to a second embodiment for forming an asperity pattern on a thin resin film. The second embodiment is different from the first embodiment of FIG. 1 in that heaters 9 are disposed on the right and left of the embossment roll 3 to heat the thin resin film 4 while the embossment roll 3 is pressed against the thin resin film 4.

According to the second embodiment, the thin resin film 4 can be softened by heating it with the heaters 9. Therefore, the application of pressure by the embossment roll 3 can be performed easily.

Figure 3:
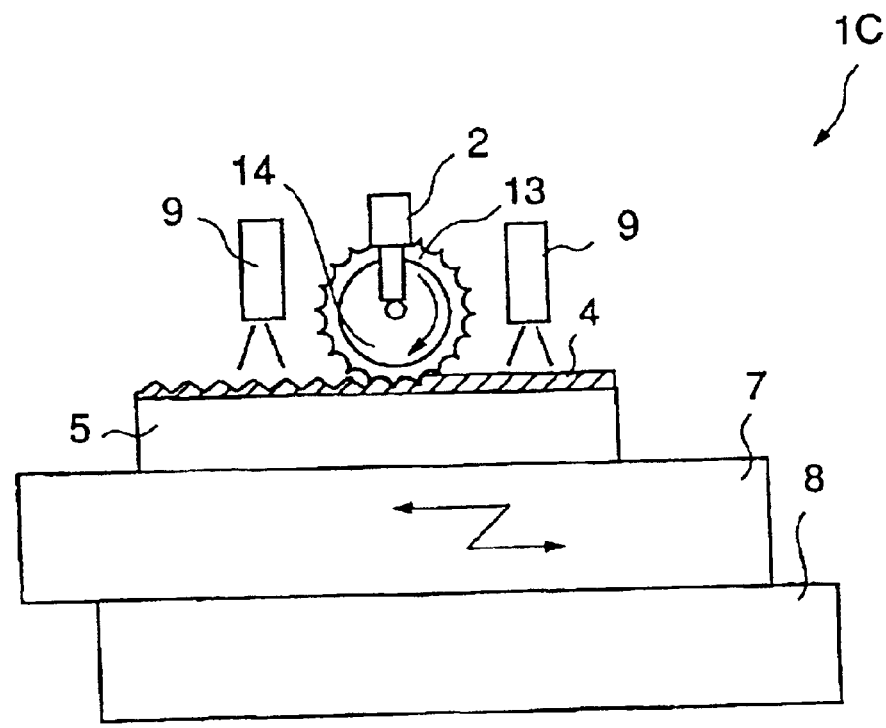
FIG. 3 illustrates the main part of an asperity pattern forming apparatus according to a third embodiment for forming an asperity pattern on a thin resin film.

FIG. 3 illustrates the main part of an asperity pattern forming apparatus according to a third embodiment for forming a micro-asperity pattern on a thin resin film. The third embodiment is different from the second embodiment of FIG. 2 in the configuration of the embossment roll (assembly) Specifically, a cylindrical roll body 14 to engage the pressurizing mechanism 2 is provided and an embossment roll member 13 having an asperity pattern is provided so as to be rotatable on the roll body 14.

The cylindrical embossment roll member 13 is given a micro-asperity pattern by carving or etching the surface of a thin plate or performing electro forming on an original member made of a resin or the like. The cylindrical roll body 14 is fitted in the cylindrical embossment roll member 13.

Figure 4:
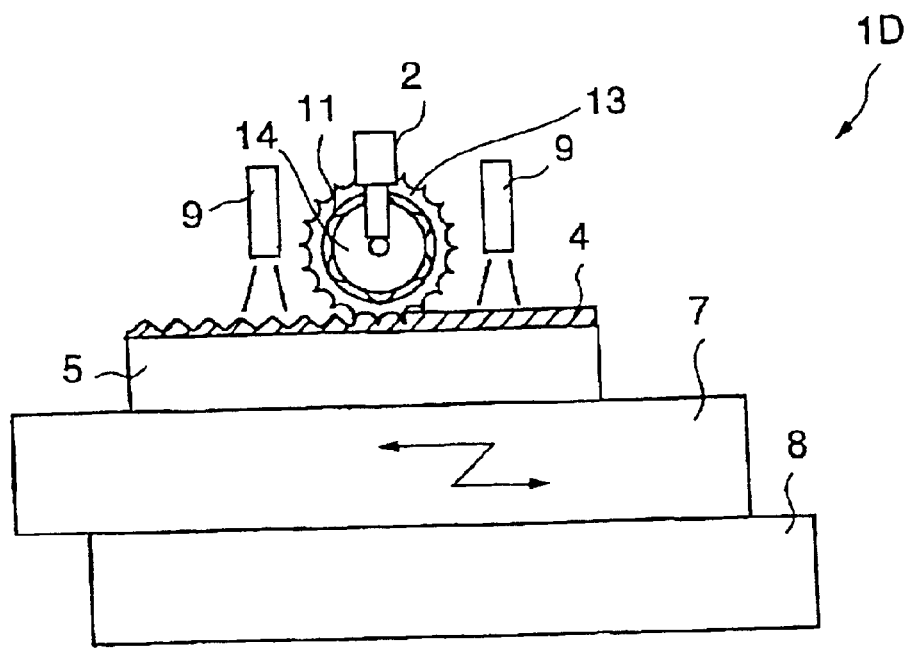
FIG. 4 illustrates the main part of an asperity pattern forming apparatus according to a fourth embodiment for forming an asperity pattern on a thin resin film.

FIG. 4 illustrates the main part of a micro-asperity pattern forming apparatus according to a fourth embodiment for forming an asperity pattern on a thin resin film. The fourth embodiment is different from the third embodiment of FIG. 3 in the configuration of the embossment roll (assembly) Specifically, in addition to the features that a cylindrical roll body 14 to engage the pressurizing mechanism 2 is provided and an embossment roll member 13 having a micro-asperity pattern is provided so as to be rotatable on the roll body 14, a thin metal plate 11 as an elastic member is interposed between the roll body 14 and the embossment roll member 13. The material of the elastic member is not limited to a metal; a heat-resistant resin such as polyimide or a damper structure in which a liquid or a gel is sealed may also be used.

According to this embodiment, since the elastic member is interposed between the roll body 14 and the embossment roll member 13, the elastic member can absorb a manufacturing error, if any, such as undulation in the embossment roll member 13, the roll body 14, etc., whereby an optical device having high accuracy of dimensions can be manufactured.

Figure 5:
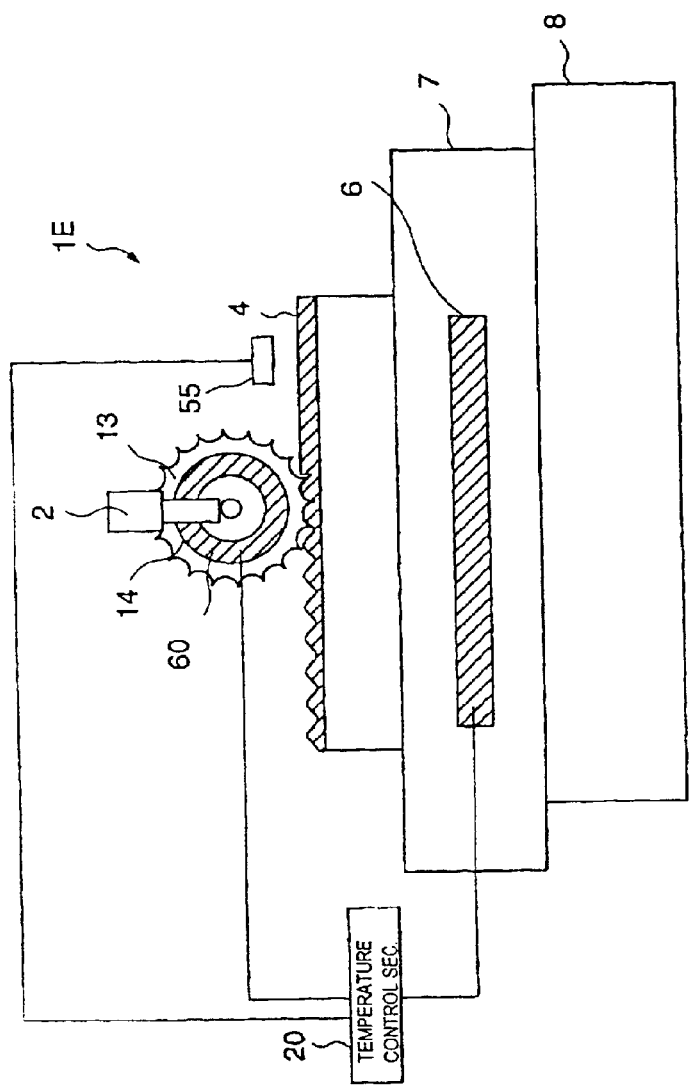
FIG. 5 illustrates the main part of an asperity pattern forming apparatus according to a fifth embodiment for forming an asperity pattern on a thin resin film.

FIG. 5 illustrates the main part of an asperity pattern forming apparatus according to a fifth embodiment for forming an asperity pattern on a thin resin film. The fifth embodiment is different in configuration from the first embodiment of FIG. 1 in that heater units 60 and 6 are provided inside the embossment roll member 13 and the transfer stage 7, respectively, and controlled by a temperature control section 20, whereby the thin resin film 4 is heated while the embossment roll member 13 is pressed against it.

In the fifth embodiment, the heater unit 60 is provided inside the roll body 14 so as to be able to heat the embossment roll member 13 from inside and the heater unit 6 is provided inside the transfer stage 7. The heater units 60 and 6 are controlled by the temperature control section 20 based on a detected temperature of a temperature sensor 55. The heaters of the heater units 60 and 6 may use a heating wire heater, a high-power lamp, a ceramic heater, or the like. Control is so made that the heater units 60 and 6 give a uniform temperature distribution to the thin resin film 4.

Although not shown in FIG. 5, heat insulating materials for heat insulation from the heater units 60 and 6 are used in the transfer stage 7, the embossment roll member 13, the pressurizing mechanism 2, and the moving mechanism 8 and a cooling mechanism of a water-cooling type, an air-cooling type, or the like.

Figure 6:
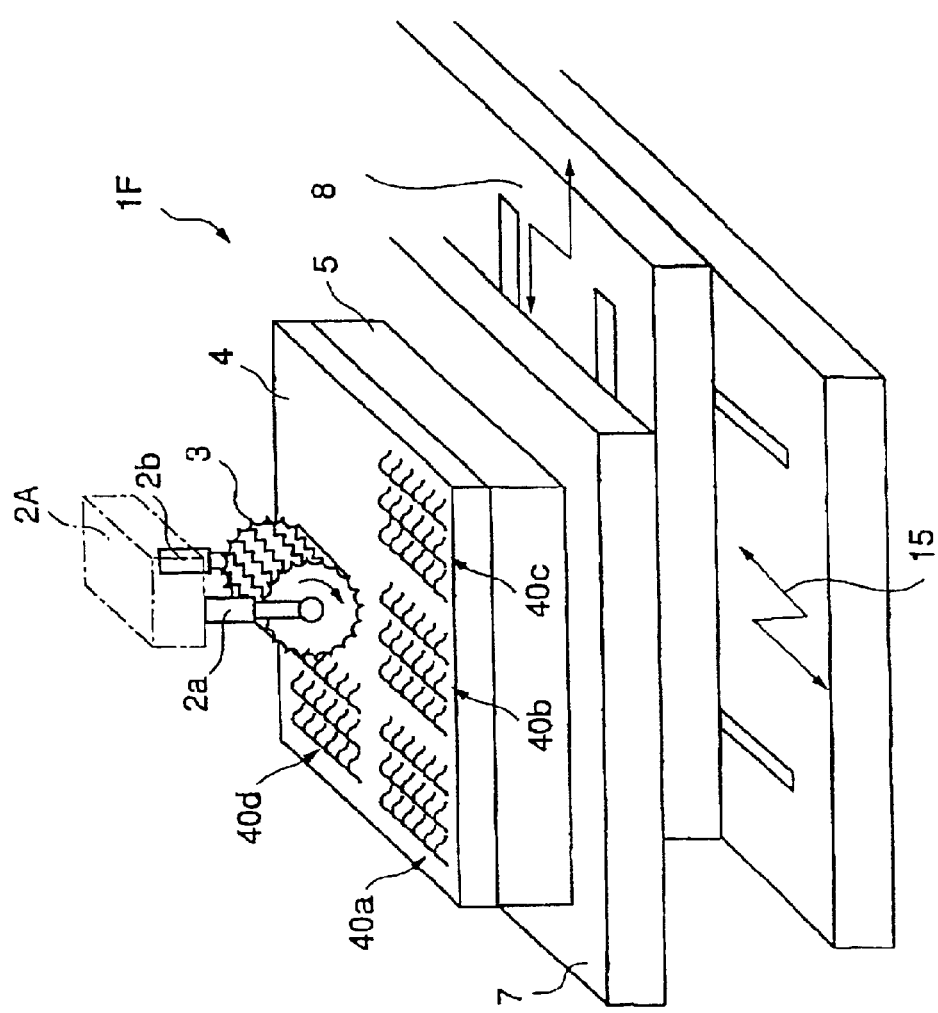
FIG. 6 illustrates the main part of an asperity pattern forming apparatus according to a sixth embodiment for forming an asperity pattern on a thin resin film.

FIG. 6 illustrates the main part of an asperity pattern forming apparatus according to a sixth embodiment for forming an asperity pattern on a thin resin film. The sixth embodiment is different from the first embodiment of FIG. 1 in that the pressurizing mechanism 2 for holding the embossment roll 3 is configured so as to be movable in the vertical direction while applying pressure to the thin resin film 4, and that the moving mechanism 8 is placed on an embossment-roll-rotation-axis-direction moving mechanism 15 so as to be movable in the embossment roll rotation axis direction.

In the sixth embodiment, with the above configuration, asperity patterns having desired lengths can be formed at desired intervals as exemplified by asperity patterns 40a–40d by moving the pressurizing mechanism 2 in the vertical direction during movement of the transfer stage 7. Therefore, asperity patterns can be formed either regularly or randomly.

Figure 7:
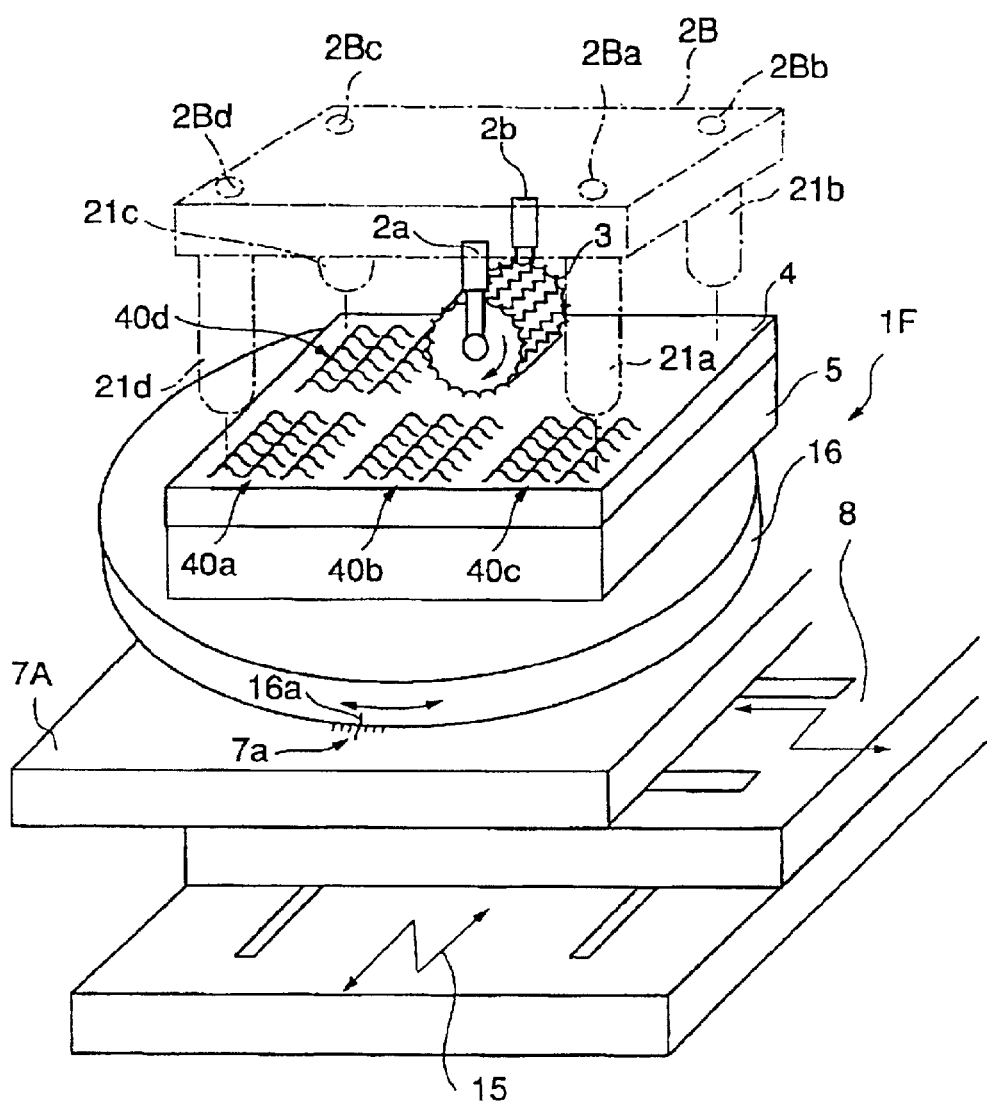
FIG. 7 illustrates the main part of an asperity pattern forming apparatus according to a seventh embodiment for forming an asperity pattern on a thin resin film.

FIG. 7 illustrates the main part of an asperity pattern forming apparatus according to a seventh embodiment for forming an asperity pattern on a thin resin film, which is an improved version of the apparatus of FIG. 6. The seventh embodiment is different from the six embodiment of FIG. 6 in that a substrate rotation direction adjustment mechanism 16 is interposed between a transfer stage 7A and the substrate 5, and that a pressurizing mechanism 2B has an alignment mark observation optical devices 21 (21a–21d) capable of reading alignment marks on the substrate 5 or the thin resin film 4.

The substrate 5 is vacuum-absorbed on the substrate rotation direction adjustment mechanism 16. Alternatively, the substrate 5 may be held by electrostatic absorption or by some other holding means.

The substrate rotation direction adjustment mechanism 16 is held by the transfer stage 7A rotatably. A fixing manipulation for fixing the mechanism 16 to the transfer stage 7A and a releasing manipulation for releasing the mechanism 16 from the transfer stage 7A to make it rotatable can be performed by manipulating a manipulation lever that is disposed at a position not shown in FIG. 7.

A fine adjustment dial is disposed a position not shown in FIG. 7. The apparatus is so configured that substrate rotation direction adjustment mechanism 16 can be rotated by manipulating the fine adjustment dial. An index 16a that is provided on the mechanism 16 and movement distance marks 7a that are provided on the transfer stage 7A provide a rough measure for a rotation angle adjustment.

Although in this embodiment the substrate rotation direction adjustment mechanism 16 is provided between the transfer stage 7A and the substrate 5, the position of the mechanism 16 is not limited to such a position. For example, the mechanism 16 may be provided under the embossment roll rotation axis adjustment mechanism 15.

An illumination light source is provided in the substrate rotation direction adjustment mechanism 16 at positions corresponding to the respective alignment mark observation optical devices 21a–21d. On the other hand, the top surface of the pressurizing mechanism 2B is formed with observation windows 2B (2Ba–2Bd) through which to read, via the alignment mark observation optical devices 21a–21d, alignment marks that are provided on the front surface of the substrate 5 that is located under the thin resin film 4.

Next, the alignment marks will be described with reference to FIGS. 8A–8D. In the case of a color liquid crystal display device, as shown in FIGS. 8A and 8B, alignment marks 5a and 5b or 22 are provided to register the color filter layer (not shown) with the liquid crystal driving elements 31 that are formed on the substrate 5.

The structure of FIG. 8A is produced in the following manner. After recesses 5a and 5b as alignment marks are formed on the substrate 5, liquid crystal driving elements 31 such as TFTs are formed by repeating steps of forming a metal film on the surface of the substrate 5 by sputtering, coating the metal film with a resist by spin coating, setting the resist by heating it at a high temperature, exposing the resist to ultraviolet light through a proper mask, removing exposed portions of the resist with a developer, again performing heating at a high temperature, removing uncovered portions of the metal film by etching, and removing the remaining resist with a remover. Finally, a thin resin film 4A is formed on the surface of the substrate 5 by spin coating.

In the case of FIG. 8B, after alignment marks 22 and liquid crystal driving elements 31 such as TFTs are formed on the surface of the substrate 5 by the above-described method, a thin resin film 4B is formed on the surface of the substrate 5 by spin coating.

As shown in FIG. 8C, the alignment marks 22 or 5a–5d are arranged at the four corners of the substrate 5. It is desirable that each of the alignment marks 22 or 5a–5d have such a shape as a cross, a square, or a circle whose center can be recognized easily.

FIG. 8D schematically shows the members located between the substrate rotation direction adjustment mechanism 16 (16A) and the pressurizing mechanism 2B as viewed from the right side in FIG. 7.

Next, the operation of the above-configured asperity pattern forming apparatus according to the seventh embodiment will be described with reference to FIG. 7.

Projection images of the alignment marks produced by the alignment mark observation devices 21a–21d are observed through the observation windows 2Ba–2Bd. If positions, observed with the alignment mark observation devices 21a–21d, of the alignment marks 22 or 5a–5d that are formed on the substrate 5 deviate from the regular positions, movement adjustments are performed by the embossment-roll-rotation-axis-direction moving mechanism 15 and/or the substrate rotation direction adjustment mechanism 16, whereby the deviations from the regular positions are made within a prescribed reference value.

Then, the transfer stage 7 is moved to a right-hand initial position. At the initial position, the pressurizing mechanism 2 is lowered to a prescribed position and the transfer stage 7 is moved leftward while the pressurizing mechanism 2 applies prescribed pressure to the thin resin film 4, whereby asperity patterns 40a–40c are formed.

After the first leftward movement of the transfer stage 7, the pressurizing mechanism 2 is elevated to the initial position, the moving mechanism 8 is moved to the viewer's side in FIG. 7 by a prescribed distance by the embossment-roll-rotation-axis-direction moving mechanism 15, and the transfer stage 7 is returned to the right-hand initial position. The pressurizing mechanism 2 is lowered to the prescribed position and the transfer stage 7 is moved leftward while the pressurizing mechanism 2 applies the prescribed pressure to the thin resin film 4, whereby asperity patterns 40d etc. are formed sequentially.

In this embodiment, the four alignment mark observation optical devices 21a–21d are used. Alternatively, one or two alignment mark observation optical devices 21 may be used. In this case, position deviations of the alignment marks are determined by driving the embossment-roll-rotation-axis-direction moving mechanism 15 or the moving mechanism 8 and the deviations from the regular positions are made within the prescribed reference value by driving the substrate rotation direction adjustment mechanism 16.

Although in this embodiment the alignment marks are projected to the observation windows 2Ba–2Bd, they may be observed on a monitor screen by using a CCD camera or the like.

The alignment marks may be formed by directly processing the substrate 5 itself by wet etching, dry etching, sand blasting, embossment, or the like. Alternatively, a thin film of a metal, an insulator, a resin, or the like may be formed on the surface of the substrate 5 by spin coating, evaporation, CVD, or the like and then processed by wet etching, dry etching, sand blasting, embossment, or the like.

In this embodiment, the alignment marks are formed on the surface of the substrate 5. Another configuration is possible in which alignment mark portions are formed, together with the asperity pattern, on the embossment roll 3 at positions distant from alignment marks of the embossment roll 3 itself and additional alignment marks corresponding to the alignment marks 5a and 5b or 22 are formed on the surface of the thin resin film 4 and observed with the alignment mark observation optical devices 21.

Figure 9:
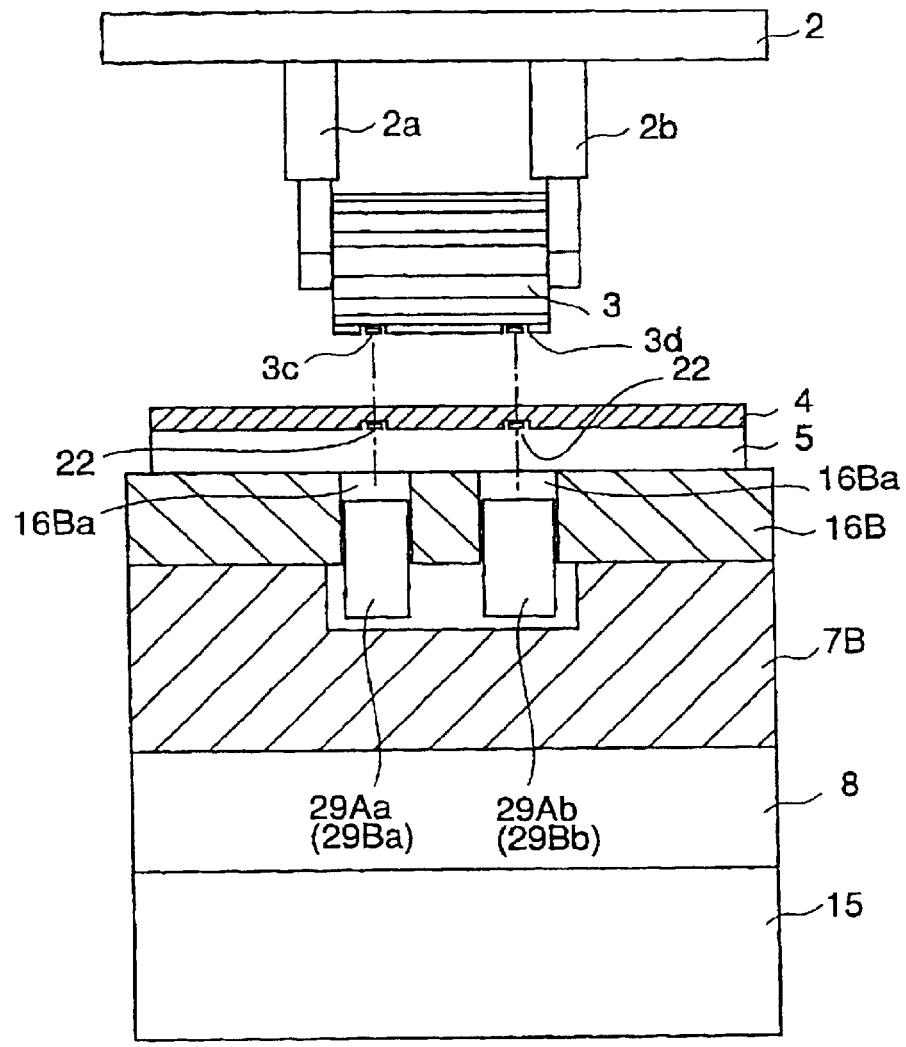
FIG. 9 illustrates the main part of an asperity pattern forming apparatus according to an eighth embodiment having alignment mark observation devices under a reflection plate.
Figure 10A:
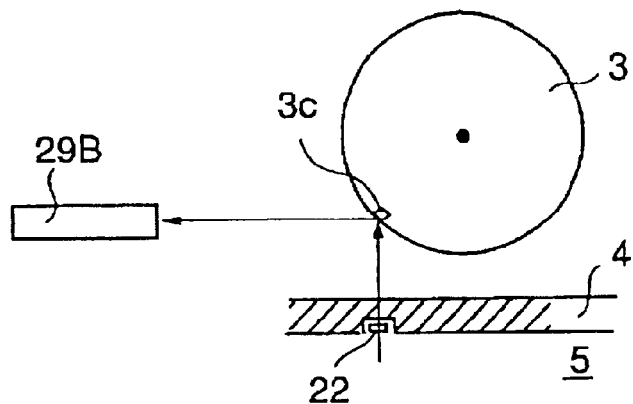
FIGS. 10A–10C illustrate observation methods of alignment mark observation devices.
Figure 10B:
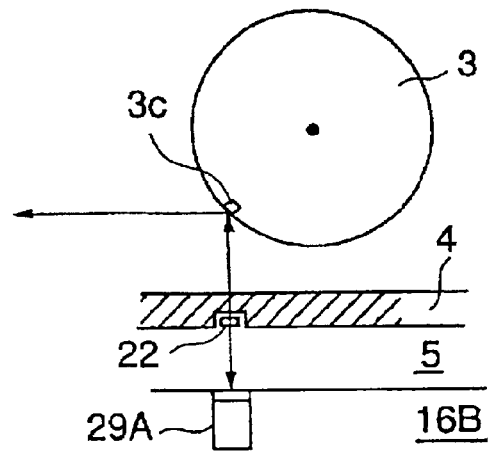
Figure 10C:
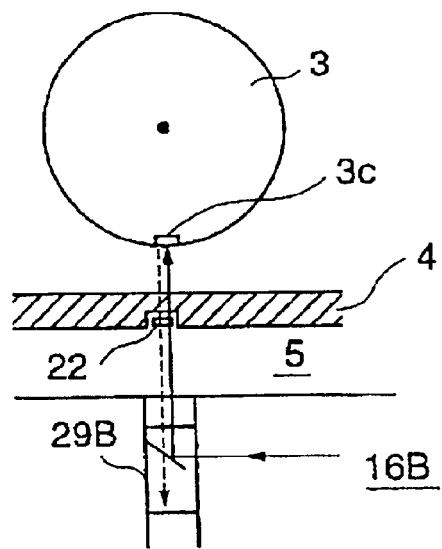

Next, an asperity pattern forming apparatus according to an eighth embodiment having alignment mark observation devices under the reflection plate will be described with reference to FIG. 9. Whereas the apparatus of FIG. 8D has the pressurizing mechanism 2B, the substrate rotation direction adjustment mechanism 16A, and the transfer stage 7A, the apparatus of FIG. 9 uses a pressurizing mechanism 2C, a substrate rotation direction adjustment mechanism 16B, and a transfer stage 7B. An embossment roll 3 that can be rotated by the pressurizing mechanism 2C is provided with alignment marks 3c and 3d on the outer circumferential surface that is formed with a micro-asperity pattern. A substrate 5 is held by the substrate rotation direction adjustment mechanism 16B. Through-holes 16Ba and 16Bb are formed through the substrate rotation direction adjustment mechanism 16B, and alignment mark observation optical devices 29Aa and 29Ab are provided in and held by the respective through-holes 16Ba and 16Bb. Photodetecting means are provided in the respective alignment mark observation optical devices 29Aa and 29Ab and connected to a monitor via a computer (not shown).

Where the alignment mark observation optical devices 29Aa and 29Ab have fields of view that are wider than an adjustment range, they may be held by the transfer stage 7B. Another configuration is possible in which the alignment mark observation optical device 29B is disposed at such a position as to be able to view the alignment mark 3c on the outer circumferential surface of the embossment roll 3 as shown in FIG. 10A and the alignment mark observation optical device 29B detects light that comes via the substrate-5-side alignment mark 22. Still another configuration is possible in which the alignment mark observation optical device 29A is disposed under the substrate 5 as shown in FIG. 9 and detects light coming via the alignment mark 3c from outside the thin resin film 4 as shown in FIG. 10B. Yet another configuration is possible in which, as shown in FIG. 10C, the alignment mark 3c reflects light coming from the alignment mark observation device 29B via the alignment mark 22 that is located right over the alignment mark observation device 29B and the alignment mark observation device 29B detects resulting reflection light.

Next, the operation of the above-configured asperity pattern forming apparatus according to the eighth embodiment will be described.

Projection images of the alignment marks 22 produced by the alignment mark observation devices 29Aa and 29Ab are observed by the above-mentioned monitor. If positions, observed with the alignment mark observation devices 29Aa and 29Ab, of the alignment marks 22 that are formed on the substrate 5 deviate from the regular positions, movement adjustments are performed by the embossment-roll-rotation-axis-direction moving mechanism 15 and/or the substrate rotation direction adjustment mechanism 16B, whereby the deviations from the regular positions are made within a prescribed reference value.

Then, the transfer stage 7B is moved to an initial position. At the initial position, the pressurizing mechanism 2 is lowered to a prescribed position and the transfer stage 7B is moved while the pressurizing mechanism 2 applies prescribed pressure to the thin resin film 4. An asperity pattern is formed as the embossment roll 3 rotates.

In this embodiment, the two alignment observation optical devices 29Aa and 29Ab are used. Alternatively, one or four alignment mark observation optical devices may be used. In this case, position deviations of the alignment marks are determined by driving the embossment-roll-rotation-axis-direction moving mechanism 15 or the moving mechanism 8 and the deviations from the regular positions are made within the prescribed reference value by driving the substrate rotation direction adjustment mechanism 16B.

Figure 11:
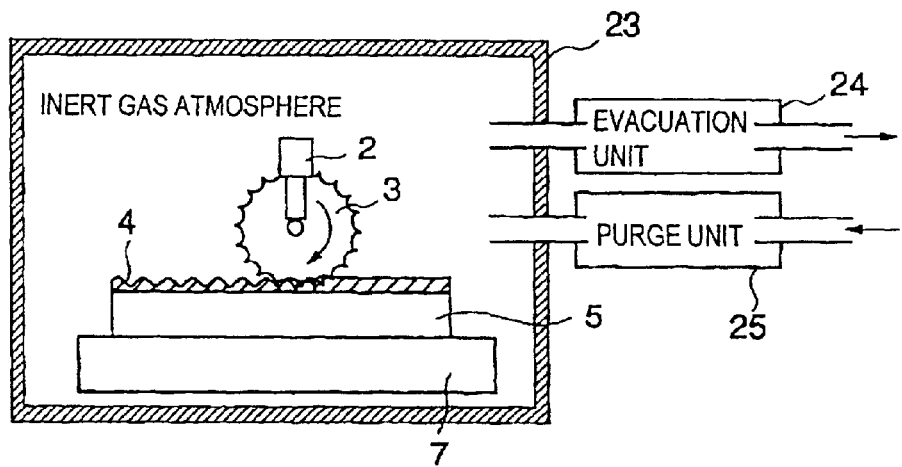
FIG. 11 illustrates the main part of an asperity pattern forming apparatus according to a ninth embodiment for forming an asperity pattern on a thin resin film that is provided in an inert gas atmosphere.

FIG. 11 illustrates the main part of an asperity pattern forming apparatus according to a ninth embodiment for forming an asperity pattern on a thin resin film that is provided in an inert gas atmosphere. As shown in FIG. 11, a transfer stage 7 is provided in an airtight chamber 23 and a substrate 5 that is coated with a thin resin film 4 is held by the transfer stage 7 in a detachable manner. A pressurizing mechanism 2 is provided above the thin resin film 4 so as to be movable in the vertical direction and the right-left direction. An embossment roll 3 is rotably attached to the pressurizing mechanism 2.

An evacuation unit 24 is connected to the chamber 23 so as to be able to exhaust a gas from the chamber 23. Provided with a ventilation fan, a rotary pump, or the like, the evacuation unit 24 can exhaust a gas from the chamber 23 to some extent. A purge unit 25 is also connected to the chamber 23 so as to be able to supply a prescribed gas to the chamber 23. As a mechanism for supplying an inert gas such as $N_2$ or Ar to the chamber 23, the purge unit 25 is provided with a device for controlling a gas flow rate such as mass flow controller or an APC valve. The purge unit 25 is connected to a gas cylinder or a gas refining device as an inert gas supply source (not shown).

In the above-configured asperity pattern forming apparatus according to this embodiment, the substrate 5 that is spin coated with the thin resin film 4 is fixed to the transfer stage 7. Then, the evacuation unit 24 is caused to start operating, whereby the air is exhausted from the chamber 23. After the operation of the evacuation unit 24 is stopped, the purge unit 25 is caused to start operating, whereby an inert gas is introduced into the chamber 23. Then, the pressurizing mechanism 2 is moved rightward from a left-hand initial position in the chamber 23 while applying prescribed pressure to the thin resin film 4, whereby an asperity pattern is formed on the thin resin film 4.

In this embodiment, the air is exhausted from the chamber 23 in advance by the evacuation unit 24. Therefore, even if impurities suspend in the air inside the chamber 23, they are exhausted and an asperity pattern is formed in an inert gas atmosphere. This makes it possible to prevent a phenomenon that impurities stick to the thin resin film 4 during formation of an asperity pattern and are finally fixed to the asperity pattern formed, and to thereby increase the production yield of an optical device.

Although in this embodiment the pressurizing mechanism 2 is made movable in the right-left direction, it goes without saying that the transfer stage 7 may be moved by the moving mechanism 8 or the substrate rotation direction adjustment mechanism 16 may be used.

Figure 12:
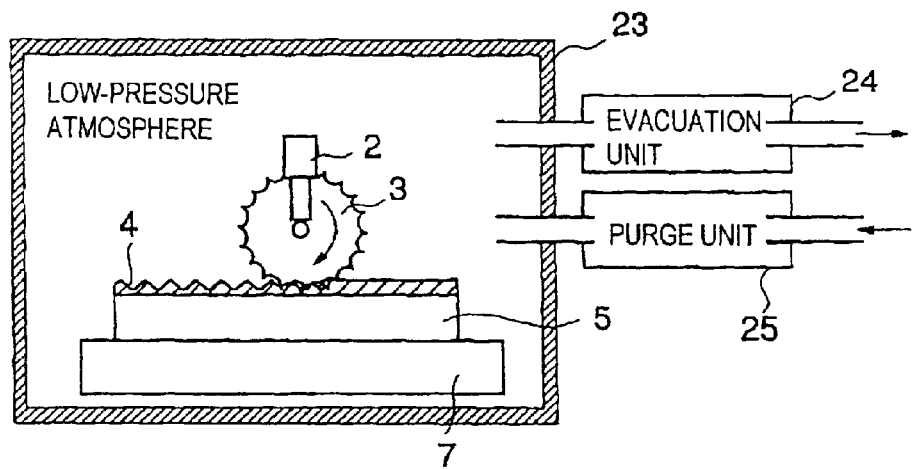
FIG. 12 illustrates the main part of an asperity pattern forming apparatus according to a 10th embodiment for forming an asperity pattern on a thin resin film that is provided in a low-pressure atmosphere.

FIG. 12 illustrates the main part of an asperity pattern forming apparatus according to a 10th embodiment for forming an asperity pattern on a thin resin film that is provided in a low-pressure atmosphere. This embodiment is different from the ninth embodiment in that in the chamber 23 an optical device is manufactured in a low-pressure (lower than atmospheric pressure) atmosphere rather than in an inert gas atmosphere.

The evacuation unit 24 that is connected to the chamber 23 is provided with a rotary pump, a turbo pump, a diffusion pump, or the like so as to be able to exhaust a gas from the chamber 23 to establish a pressure of $10^{-3}$ to $10^{-7}$ Torr inside the chamber 23. An inert gas such as $N_2$ or Ar may be supplied to the chamber 23 by the purge unit 25. Or an optical device may be manufactured without introducing an inert gas.

In this embodiment, the air is exhausted from the chamber 23 in advance by the evacuation unit 24. Therefore, even if impurities suspend in the air inside the chamber 23, they are exhausted and water is easily evaporated and exhausted due to the reduction of the pressure inside the chamber 23. Since an asperity pattern can be formed in a clean atmosphere, a phenomenon that suspending impurities, vapor, etc. stick to the thin resin film 4 during formation of an asperity pattern and are finally fixed to the asperity pattern formed can be prevented. Therefore, the production yield of an optical device can be increased.

Figure 13:
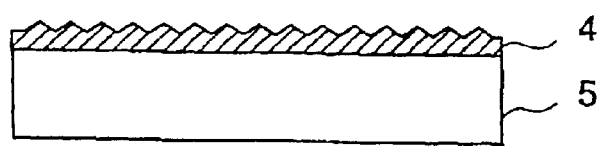
FIG. 13 shows a substrate that is coated with a thin resin film having an asperity pattern.

By using any of the apparatuses according the above embodiments, an asperity pattern can be formed on the thin resin film 4 that is formed on the substrate 5 as shown in FIG. 13. An optical device having the asperity pattern thus formed can be used as a transparent diffraction grating substrate, a hologram, an optical storage medium such as an optical disc, a Fresnel lens, a micro-lens array, an optical waveguide, or the like by properly selecting an asperity pattern shape, a material of the thin resin film 4, a material of the substrate 5, etc.

Figure 14:
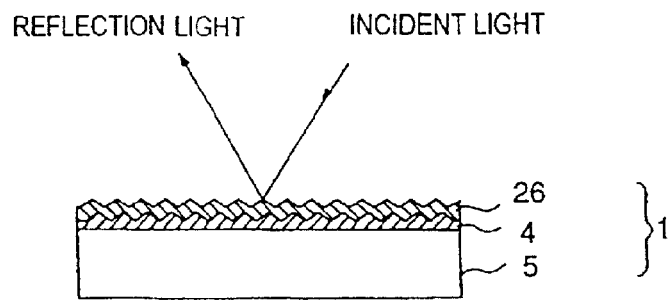
FIG. 14 shows a reflection plate whose asperity pattern is coated with a reflection film.

A reflection plate shown in FIG. 14 can be manufactured by forming a reflection film 26 by depositing a high reflectivity material such as Al, Ag, an Al alloy, or an Ag alloy on the asperity pattern surface of the above substrate at a thickness of about 2,000 Å by sputtering, evaporation, or the like.

In this case, the adhesiveness between the thin resin film 4 and the reflection film 26 can be increased by laying an intermediate film made of Tr, Cr, Si, or the like between the thin resin film 4 and the reflection film 26, that is, by forming the reflection film 26 after coating the asperity pattern surface with the intermediate film.

The above reflection plate can be used as an optical device such as a hologram, a Fresnel mirror, a micro-mirror array, or the like. The above reflection plate can be used as an electrode substrate of a liquid crystal display device of an STN type or the like by forming a metal thin film as the reflection film 26 and planarizing and sealing the metal thin film by spin-coating its surface with an insulation film such as a transparent thin resin film of polyimide, an acrylic resin, or the like.

Figure 15:
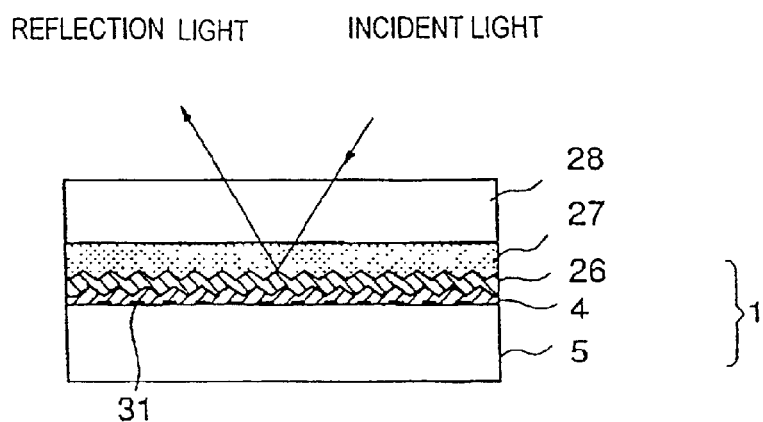
FIG. 15 shows a reflection-type liquid crystal display device (according to one embodiment)

FIG. 15 shows a liquid crystal display device according to one embodiment. A substrate 5 is made of no-alkali glass or a highly heat-resistant resin (molded). Liquid crystal driving elements 31 such as TFTs are formed on the surface of the substrate 5.

A thin resin film 4 is formed by spin coating with a highly heat-resistant material such as a polyimide resin having a glass transition temperature that is sufficiently higher than 200° C. Since a reflection film 26 is formed on the thin resin film 4 by depositing a high-reflectivity material such as Al, Ag, an Al alloy, or an Ag alloy by sputtering, evaporation, or the like after formation of an asperity pattern on the thin resin film 4, the glass transition temperature of the thin resin film 4 needs to be approximately equal to or higher than that of the substrate 5 on which the liquid crystal driving elements 31 are formed.

The light transmittance of the reflection film 26 can be set high by controlling its thickness, which makes it possible to manufacture a semi-transmission-type liquid crystal display device.

Figure 16:
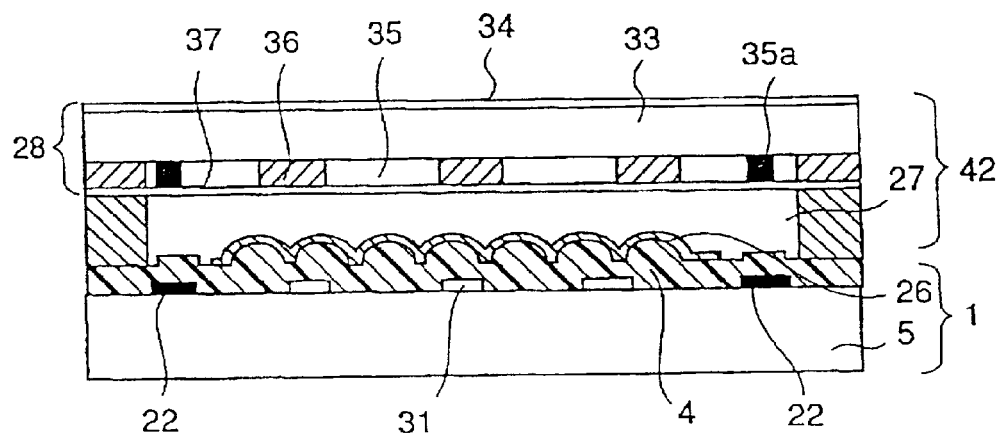
FIG. 16 is a sectional view of a liquid crystal display device.

FIG. 16 outlines the structure of a reflection-type liquid crystal display device having a reflection plate 1 that is produced in the above-described manner. A liquid crystal panel 42 has the reflection plate 1 as a back-side substrate.

On the other hand, a front-side substrate is produced by forming a black matrix 36, color filters 35, a transparent electrode 37 of ITO or the like, and other members on the back surface of a glass substrate 33 and bonding a polarizing plate 34 to the front surface of the glass substrate 33. A reflection-type liquid crystal display device is completed by interposing a liquid crystal layer 27 between the back-side substrate and the front-side substrate.

Figure 23A:
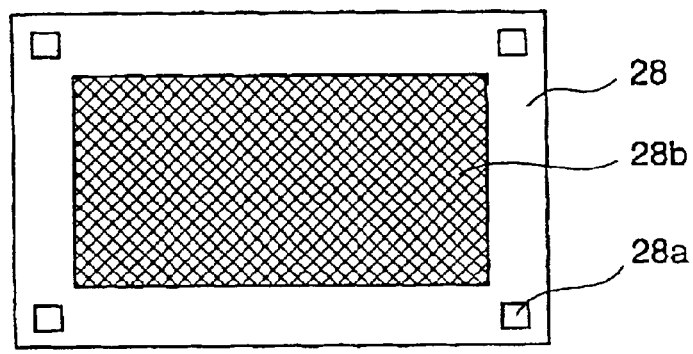
FIGS. 23A–23C illustrate differences between a case that alignment marks for liquid crystal driving elements are formed on a reflection film and a case that alignment marks for liquid crystal driving elements are formed between a reflection film and a color filter layer.
Figure 23B:
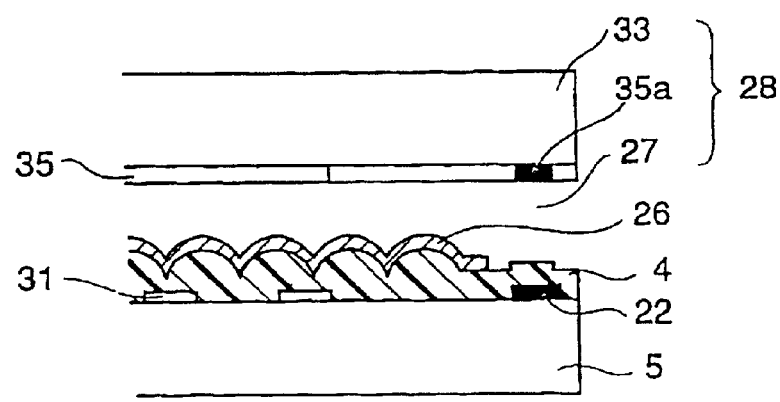
Figure 23C:
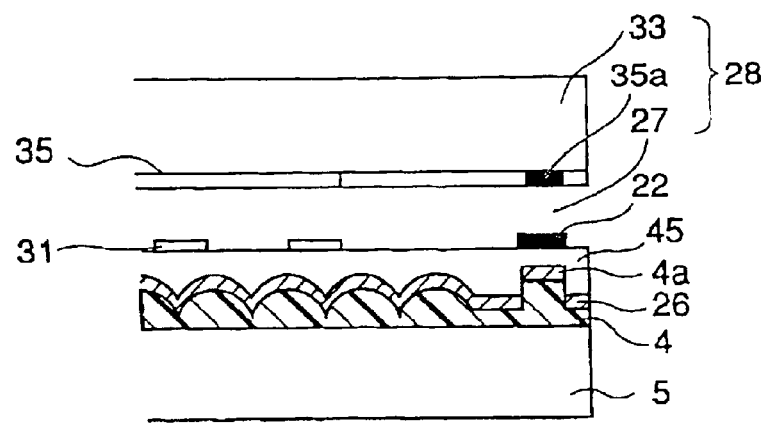

The above structure eliminates the need for forming the planarization layer 45 and forming the liquid crystal driving elements 31 and the alignment marks 22 on the planarization layer 45 (see FIG. 23C). Since the liquid crystal panel 42 and the reflection plate 1 are integrated with each other, the reflection-type liquid crystal display device can be made thin.

Figure 17:
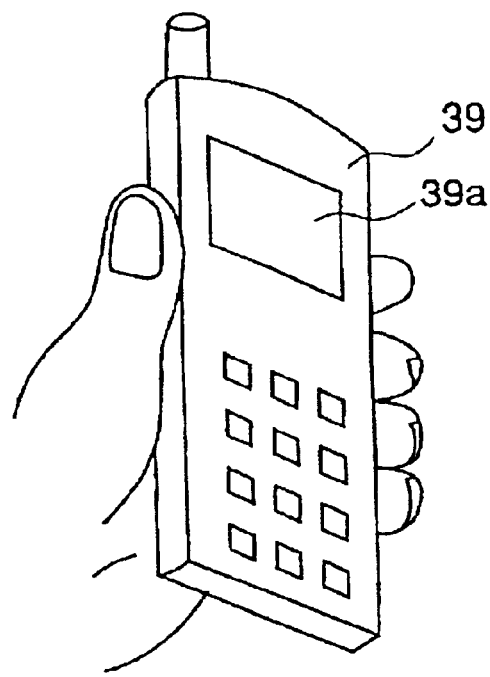
FIG. 17 shows an electronic apparatus using a liquid crystal display device.

FIG. 17 shows an electronic apparatus 39 such as a cellular phone or a low-power-consumption radio apparatus using a reflection-type liquid crystal display device according to the above embodiment having a reflection plate.

In the electronic apparatus 39 having the above configuration, a user can recognize an image on a monitor screen 39a that is formed by using light incident on the monitor screen 39a.

It goes without saying that the above embodiment can be applied to not only the electronic apparatus 39 but also other portable information terminals such as an electronic note, a portable computer, and a portable TV receiver.

Next, a description will be made of a method of forming alignment marks on a thin resin film together with a micro-asperity pattern with a stamper and registering the alignment marks of the thin resin film with alignment marks of a color filter layer.

Figure 18A:
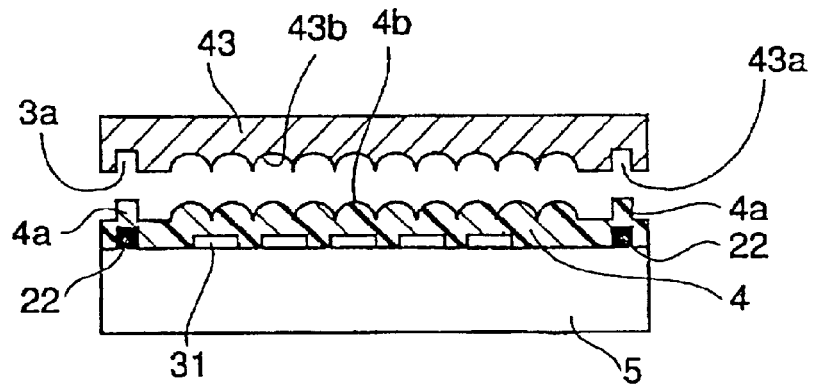
FIGS. 18A–18C illustrate a relationship between alignment marks of an asperity pattern and those of liquid crystal driving elements.
Figure 18B:
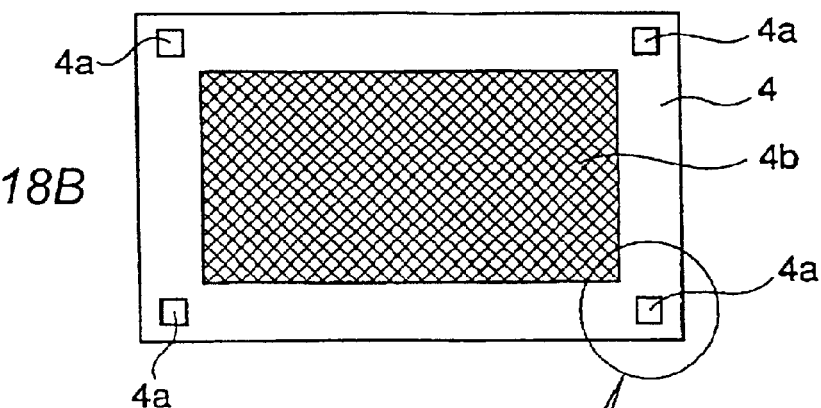

A case of forming an asperity pattern with a plate-like stamper 43 will be described with reference to FIGS. 18A–18C. As shown in FIG. 18A, the bottom surface of the stamper 43 (described later) is formed with a die surface 43b for formation of an asperity pattern and stamper alignment marks 43a as positional references of the die surface 43b.

A transparent glass substrate 4 is disposed under the stamper 43. The top surface of the substrate 4 is formed with liquid crystal driving elements TFTs (thin-film transistors) 31 and alignment marks 22 as positional references of the liquid crystal driving elements 31.

A resin layer 4 in which an asperity pattern is formed on an ultraviolet-curing resin, an acrylic resin, or a like resin is formed so as to seal the liquid crystal driving elements 31 and the alignment marks 22. The alignment marks 43a and the die surface 43b of the stamper 43 correspond to alignment marks 4a and an asperity pattern 4b of the resin layer 4, respectively, and the alignment marks 4a and the asperity pattern 4b are formed by pressing the resin layer 4 with the stamper 43 from above.

Figure 18C:
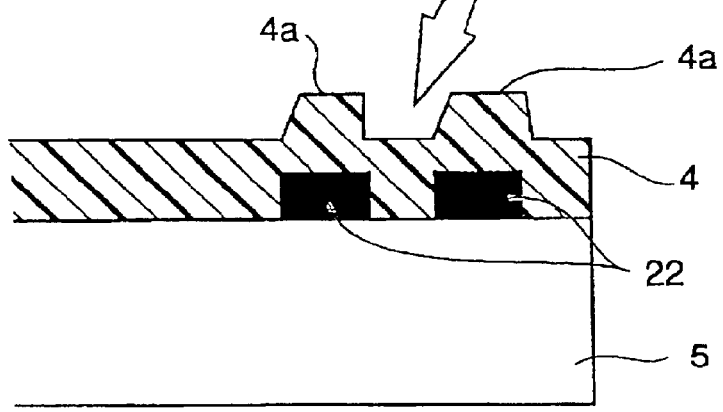

As shown in FIG. 18C, a plurality of alignment marks 4a may be formed so as to correspond to respective alignment marks 22.

Next, a case of forming an asperity pattern using a cylindrical stamper will be described with reference to FIGS. 19A–19E. A large number of reflection plates 1 can be manufactured (copied) by using a die called an embossment roll member 13 that is a cylindrical stamper. First, a manufacturing method of the embossment roll member 13 will be described.

(a) An original plate 32 is prepared in which alignment marks 32a and an asperity pattern 32b having the same shape as an asperity pattern of a reflection plate 1 to be manufactured are provided on a substrate 53.

(b) A stamper member 44 is produced by depositing a stamper material such as nickel on the original plate 32 by electroforming.

(c) The stamper member 44 is separated from the original plate 32 and taken out. The stamper member 44 has asperity pattern inverted shapes 13b and alignment mark inverted shapes 13a corresponding to the asperity pattern 32b and the alignment marks 32a, respectively, of the original plate 32, and serves as a die for a reflection plate 1.

Then, liquid crystal driving elements 31 such as TFTs and alignment marks 22 are formed on the glass substrate 5 by repeating steps of forming a metal film on the glass substrate 5 by sputtering, coating the metal film with a resist by spin coating, setting the resist by heating it at a high temperature, exposing the resist to ultraviolet light through a proper mask, removing exposed portions of the resist with a developer, again performing heating at a high temperature, removing portions of the metal film that are not uncovered with the resist by etching, and removing the remaining resist with a remover.

Then, an embossment roll having an embossment roll member 13 is produced by attaching the stamper member 44 to a roll body 14 so as to surround it and assume a cylindrical shape. Then, after an acrylic or like resin layer 4 is formed on the glass substrate 5 by spin coating as shown in FIG. 19D, an asperity pattern 4b and alignment marks 4a are formed as shown in FIG. 19E by pressing the embossment roll against the resin layer 4 while rotating the embossment roll.

Since the stamper member 44 is very thin, it can be deformed into a cylindrical shape even if it is made of a metal.

The sizes of the asperity pattern inverted shapes 13b and the alignment mark inverted shapes 13a of the stamper member 44 are so set that their shape variations that occur when the stamper member 44 is deformed into a cylindrical shape are negligible. For example, their shape variations that occur when the stamper member 44 is deformed into a cylindrical shape are negligible if the depths of the asperity pattern inverted shapes 13b and the alignment mark inverted shapes 13a are ¹⁄₁₀₀₀ or less of the radius of the cylinder.

Then, a reflection film is formed by depositing a metal thin film of Ag, Al, or the like on the asperity pattern 4b of the resin layer 4 by sputtering, whereby a reflection plate 1 is completed.

The embossment roll has the asperity pattern die portion as the inverted die for press-forming an asperity pattern on the surface of a reflection plate and the alignment mark die portions that are formed on both sides of the asperity pattern die portion and serve as assembling references of the asperity pattern die portion. Where the alignment marks 22 of the liquid crystal driving elements 31 are formed, together with the liquid crystal driving elements 31, on the surface of the substrate 5 of a reflection plate 1 to be formed, the alignment marks 22 of the liquid crystal driving elements 31 can be detected through the resin layer (asperity pattern layer) 4 that is formed on the surface of the substrate 5 by spin coating. Alignment marks 4a are formed on the surface of the resin layer 4 by pressing the embossment roll against it after registration with the alignment marks 22 is made. The alignment marks 4a can be used as references for registration with a color filter layer that is disposed over the reflection plate 1. It is not necessary to remove parts of the resin film 4 to such an extent that the alignment marks 22 of the liquid crystal driving elements 31 can be detected. This contributes to reduction of the number of steps of the reflection plate manufacturing process.

Figure 22A:
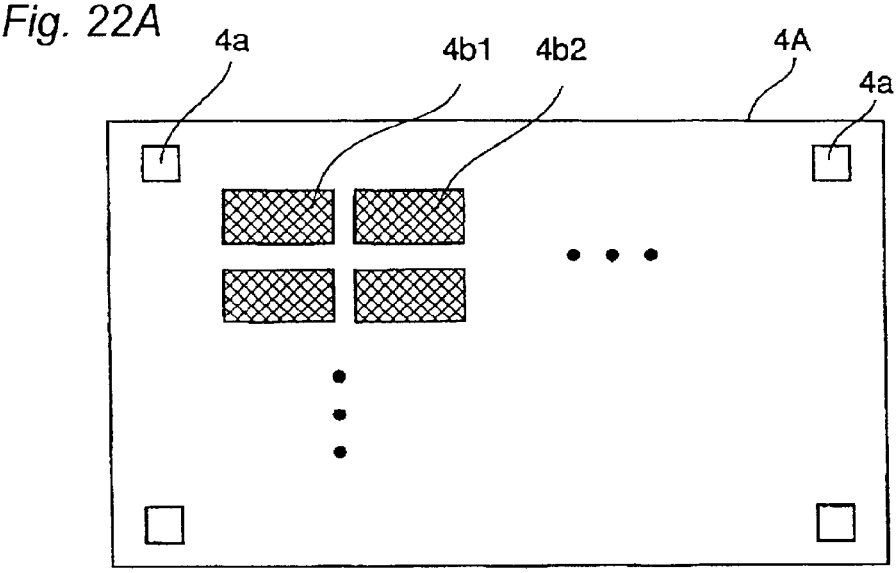
FIGS. 22A and 22B illustrate alignment mark arrangement positions.
Figure 22B:
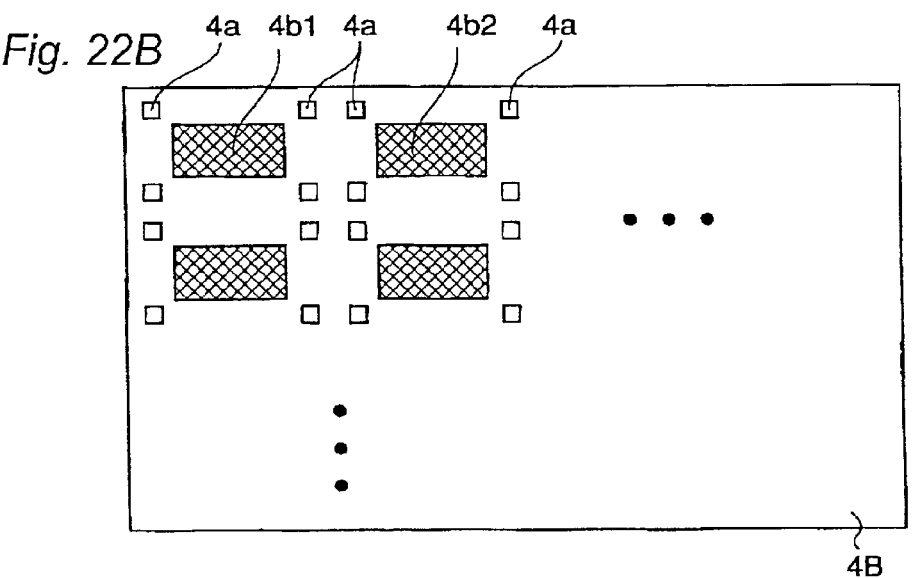

FIGS. 22A and 22B illustrate alignment mark arrangement positions.

FIG. 22A shows a case that alignment marks 4a are arranged at the four corners of an asperity pattern layer 4A. Asperity patterns 4b1, 4b2, . . . are formed by using the alignment marks 4a as references.

FIG. 22B shows a case that alignment marks 4a are arranged at the four corners of each of asperity patterns 4b1, 4b2, . . . . Where an asperity pattern portion 4b of a reflection plate is divided into small blocks 4b1, 4b2, . . . as in this case and a plurality of alignment marks are formed for an asperity pattern of each small block, the asperity pattern 4b can be registered with a color filter layer accurately in a main portion even if the accuracy is lowered in a peripheral portion of a monitor screen. This contributes to increase of the yield.

In each of the cases of FIGS. 22A and 22B, a liquid crystal display device can be assembled by registering the alignment marks 4a with the alignment marks of the color filter layer.

The subject of registration using the alignment marks 4a is not limited to the color filter layer. The alignment marks 4a may be registered with the alignment marks of other optical components such as a polarizing plate and a liquid crystal substrate.

Figure 20A:
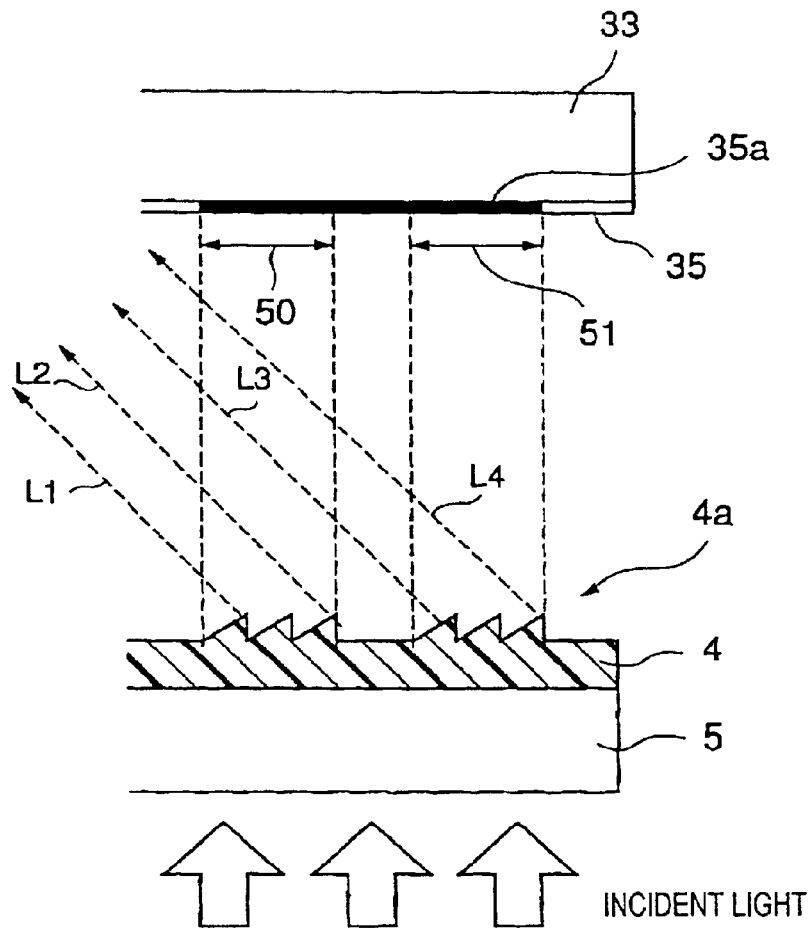
FIGS. 20A and 20B show how to observe alignment marks with transmission illumination.
Figure 20B:
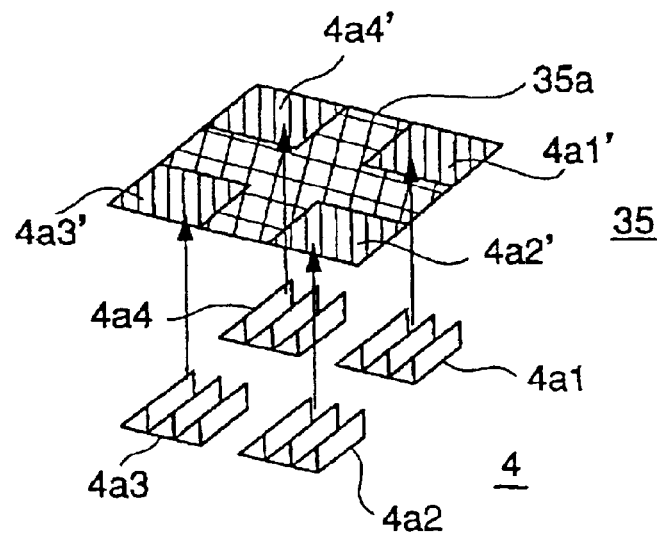

FIGS. 20A and 20B illustrates an alignment shape. Alignment marks 4a of an asperity pattern 4 are formed at such positions as to correspond to alignment marks 35a of a color filter layer 35 that is provided in a liquid crystal panel 42. Since the alignment marks 4a have a triangular cross-section, light entering a substrate 5 is refracted by the exit faces of the triangular portions and goes along lines L1–L4 after being output from the alignment marks 4a; the light does not shine on regions 50 and 51. Therefore, if an alignment mark 35a of a color filter layer 35 has a rectangular shape as shown in FIG. 20B, an alignment mark 4a1 produces, at one corner of the alignment mark 35a, a projected portion 4a1' to which no light reaches. Similarly, alignment marks 4a2, 4a3, and 4a4 produce projected portions 4a2', 4a3', and 4a4', respectively. Usually, an alignment mark is formed by sputtering a metal film and recognized by a difference in contrast from a portion around the alignment mark by causing the alignment mark to reflect or shield incident light. In this embodiment, light enters the triangular portions and the alignment mark is projected in the light incidence direction. This provides high contrast without the need for forming a special metal film.

Figure 21A:
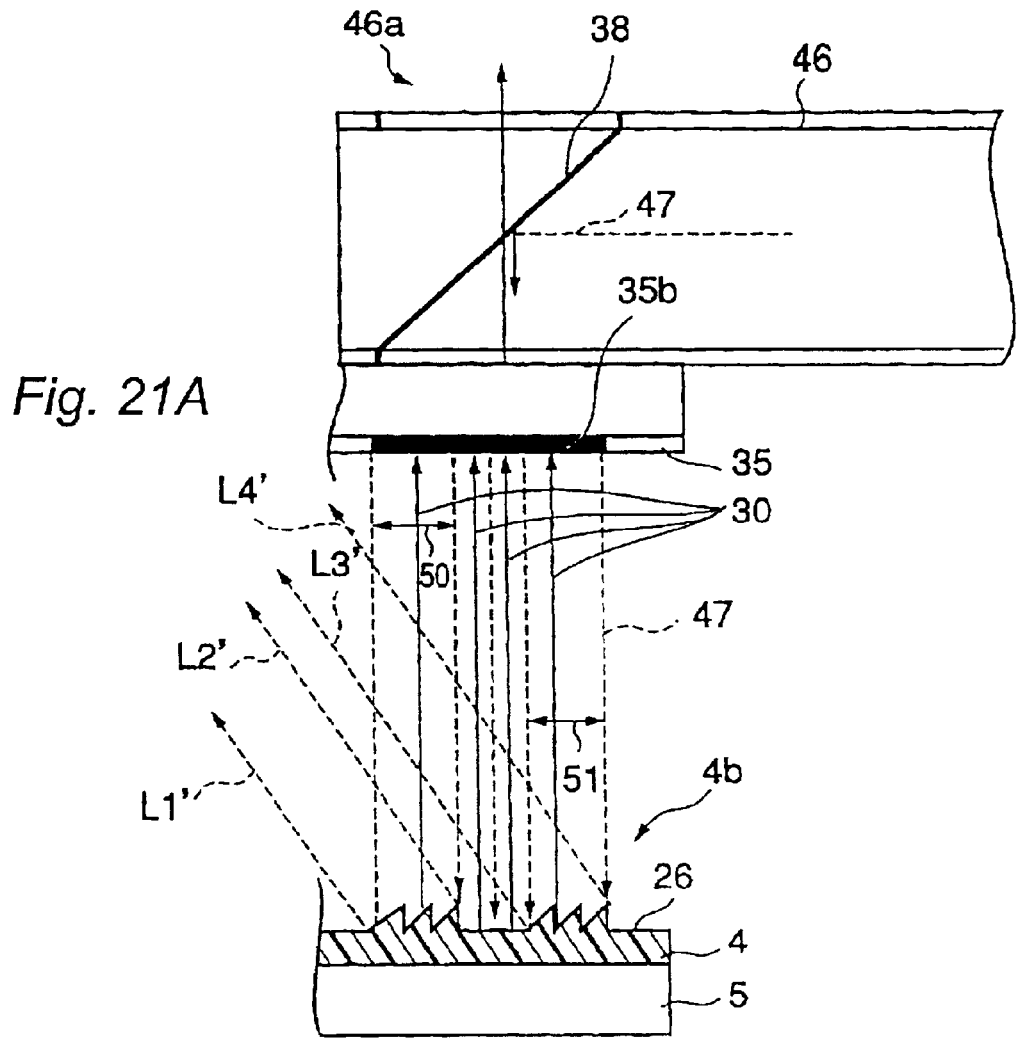
FIGS. 21A and 21B show how to observe alignment marks with epi-illumination.
Figure 21B:
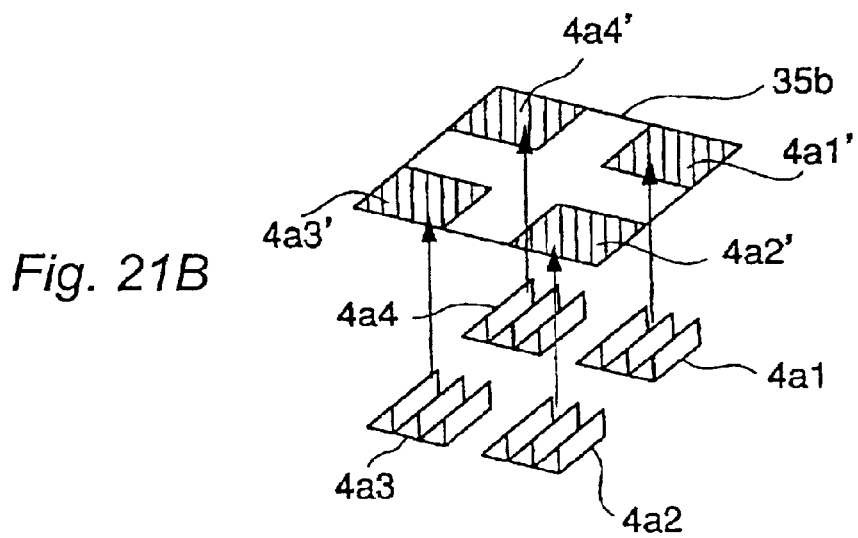

FIGS. 21A and 21B illustrate an alignment mark shape that is used with epi-illumination. Each alignment mark 36b of the color filter layer 35 provided in the liquid crystal panel 42 (see FIG. 16) is transparent over its entire area. Alignment marks 4b of the asperity pattern 4 are formed at such a position as to correspond to the alignment mark 35b.

On the other hand, an observation light introducing mechanism 46 over the top surface of the liquid crystal panel 42. Incident light coming from the right side is reflected by a half mirror 38, passes through the alignment mark 35b, and shines on the resin film 4 side.

The alignment marks 4b have a triangular cross-section. The surfaces of the alignment marks 4b and the surface of the thin resin film 4 are coated with a metal film so as to reflect incident light.

Incident light 47 is reflected by the surfaces of the triangular portions of the alignment marks 4b and goes along lines L1'–L4' after the reflection; the light does not shine on regions 50 and 51. Therefore, if the alignment mark 35b of the color filter layer 35 has a rectangular shape as shown in FIG. 21B, an alignment mark 4b1 produces, at one corner of the alignment mark 35b, a projected portion 4b1' to which no light reaches. Similarly, alignment marks 4b2, 4b3, and 4b4 produce projected portions 4b2', 4b3', and 4b4', respectively. This projection pattern can be observed through a window 46a.

Figure 19A:
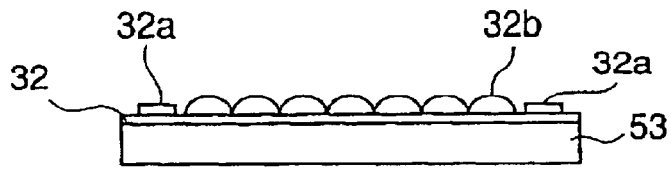
FIGS. 19A–19E illustrate a method for forming alignment marks together with an asperity pattern on a resin layer.
Figure 19B:
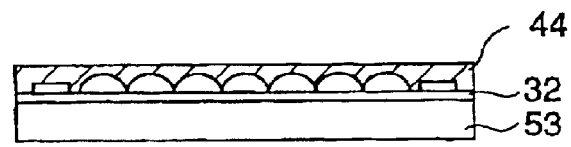
Figure 19C:
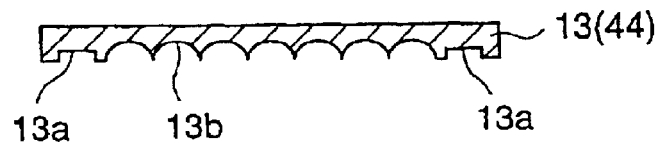
Figure 19D:
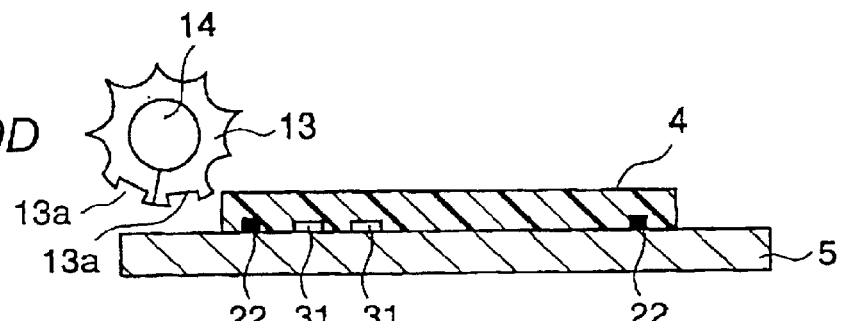
Figure 19E:
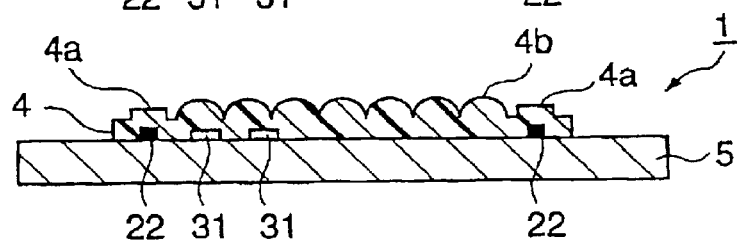

Referring to FIG. 19C, each alignment mark die portion of the stamper member 44 is formed as a recess 13a. Therefore, the alignment marks 4a or 4b of the asperity pattern layer 4 of the reflection plate 1 are formed as projections. A plurality of alignment marks 4a or 4b may be formed as shown in FIGS. 18C, 20A and 20B, and 21A and 21B. Alternatively, a single alignment mark 4a or 4b may be formed as long as it can be registered with the corresponding alignment mark 35a or 35b of the color filter layer 35 in both of the depth direction and the right-left direction. In the cases of FIGS. 20A and 20B and FIGS. 21A and 21B, a plurality of triangular shapes are formed on the top surface of the asperity pattern layer 4. To form such triangular shapes, it is necessary to form, in the stamper member 44, a plurality of triangular recesses having a right triangle cross-section the hypotenuse of which inclines so as to extend from one outside periphery of each recess 13a to its bottom. Only one such triangular recess having a right triangle cross-section may be formed in each recess 13a.

The alignment marks 4a or 4b of the asperity pattern layer 4 of the reflection plate 1 may be recesses. In this case, each alignment mark die portion of the stamper member 44 is formed as a projection that projects vertically from the bottom surface and have triangular projections having a right triangle cross-section the hypotenuse of which inclines in the direction from one outside periphery of each projection to the other.

Where each alignment mark die portion of the stamper member 44 is formed as a projection, alignment marks formed in the reflection plate 1 become recesses. The faces of the triangular recesses of alignment marks of the reflection plate 1 that are formed by the faces of the triangular projections that incline in the direction from one outside periphery of each projection of the stamper member 44 to the other are inclined accordingly. Therefore, light coming from under the reflection plate 1 is changed in optical path by the inclined faces of the respective triangular recesses and does not go along the light incidence direction, whereby dark projected portions are produced so as to correspond to the respective triangular recesses.

In the above-described reflection-type liquid crystal display device, the reflection plate is provided with the asperity pattern portion for diffusing incident light that comes through the liquid crystal panel, the asperity pattern alignment mark portions that are formed around the asperity pattern portion and serve as assembling references of the asperity pattern portion, the liquid crystal driving element alignment mark portions that are formed under the respective asperity pattern alignment mark portions, and the liquid crystal driving elements that are formed under the asperity pattern portion. The liquid crystal display device is also provided with the color filter layer that is formed over the reflection plate and has the color filter alignment mark portions. The asperity pattern alignment mark portions, the liquid crystal element alignment mark portions, and the color filter alignment mark portions that are provided at the end portions of the liquid crystal panel are recognized as dark portions in the screen of the liquid crystal display device.

In the above embodiment, the liquid crystal display device uses the reflection plate that is provided with the asperity pattern portion, the asperity pattern alignment mark portions, the liquid crystal driving elements that are formed under the asperity pattern portion, and the liquid crystal driving element alignment mark portions. Therefore, it is not necessary to separately form a planarization layer on the asperity pattern by spin coating and to form liquid crystal driving elements on the planarization layer, and hence the configuration is made simpler. Using a thinner liquid crystal display device makes it possible to construct a more compact electronic apparatus.

Since the asperity pattern alignment mark portions, the liquid crystal element alignment mark portions, and the color filter alignment mark portions that are provided at the end portions of the liquid crystal panel are recognized as dark portions in the screen of the liquid crystal display device, they do not influence an image formed by the liquid crystal pixels.

The reflection plate according to the embodiment can be used in not only the reflection-type liquid crystal display device but also other reflection-type display devices. Although not shown in any drawing, the reflection plate according to the embodiment can also be used in what is called a semi-transmission-type liquid crystal display device in which the power consumption of the backlight is set low or incident light is introduced through a member other than the liquid crystal panel.

Although the embodiment is directed to the front-surface-reflection-type reflection plate in which the asperity pattern is formed on the front surface of the reflection plate and incident light is reflected by the surfaces of asperities. The invention can also be applied to a back-surface-reflection-type reflection plate in which a glass or transparent resin substrate is used and incident light is reflected by an asperity pattern that is formed on the back surface of the substrate.

As described above, according to the invention, a micro-asperity pattern is formed on a thin resin film by pressing a cylindrical die unit whose outer circumferential surface is formed with a micro-asperity pattern against the thin resin film while rolling the die unit on the thin resin film. Therefore, air bubbles in the thin resin film are pushed and moved by recesses of the die unit and broken by projections of the die unit, whereupon the air goes out of the thin resin film. This reduces the probability of the phenomenon that the asperity pattern is deformed by air bubbles remaining in the thin resin film, which makes it possible to provide an optical device manufactured with high processing accuracy.

What is claimed is:

1. A manufacturing method of an optical device, comprising the steps of:
    preparing a cylindrical die unit, an outer circumferential surface of which is formed with a micro-asperity pattern;
    preparing a substrate that is coated with a thin resin film;
    holding the substrate by a transfer stage; and
    forming a micro-asperity pattern on the thin resin film by pressing the outer circumferential surface of the die unit against the thin resin film with pressurizing means while rolling the die unit on the thin resin film.

2. The manufacturing method according to claim 1, wherein a temperature of a room is set lower than a melting temperature of the thin resin film, and wherein at least one of the die unit and the transfer stage is heated while control is so made that the thin resin film has a temperature that is lower than a heat decomposition temperature thereof.

3. The manufacturing method according to claim 1, further comprising the step of repeating the operation of rolling the die unit on the thin resin film.

4. The manufacturing method according to claim 1, further comprising the step of adjusting an angular deviation, from a rotation axis of the die unit, of a line connecting two alignment marks of the thin resin film that are located on both sides of the rotation axis of the die unit by rotating the substrate relative to the die unit in a state that the substrate is held by the transfer stage directly or indirectly.

5. The manufacturing method according to claim 1, wherein the micro-asperity pattern is formed on the thin resin film in an inert gas atmosphere.

6. The manufacturing method according to claim 1, wherein the micro-asperity pattern is formed on the thin resin film in a low-pressure atmosphere having a pressure that is lower than atmospheric pressure.

7. The manufacturing method according to claim 2, wherein the thin resin film is made of a thermoplastic material.

8. The manufacturing method according to claim 2, wherein the thin resin film is made of a thermosetting resin.

9. The manufacturing method according to claim 1, wherein the die unit has a portion having an inverted shape of a shape of an intended alignment mark that will serve as a positional reference when an optical element is disposed at a prescribed position with respect to the substrate, and wherein the alignment mark is press-formed on the thin resin film together with the micro-asperity pattern.

10. A manufacturing apparatus of an optical device, comprising:
    a transfer stage for holding a substrate that is coated with a thin resin film;
    a cylindrical die unit, an outer circumferential surface of which is formed with a micro-asperity pattern;
    a moving mechanism for moving the transfer stage in a direction that crosses a rotation axis of the die unit; and
    a pressurizing mechanism for pressing the outer circumferential surface of the die unit against the thin resin film in such a manner that the die unit can rotate about the rotation axis,
    wherein a micro-asperity pattern is formed on the thin resin film as the die unit rolls on the thin resin film while being pressed against the thin resin film.

11. The manufacturing apparatus according to claim 10, wherein the die unit comprises a stamper member for press-forming the micro-asperity pattern on the thin resin film and a roll body for holding the stamper member.

12. The manufacturing apparatus according to claim 10, wherein the die unit comprises a stamper member for press-forming the micro-asperity pattern on the thin resin film, a roll body for holding the stamper member, and an elastic member interposed between the stamper member and the roll body.

13. The manufacturing apparatus according to claim 10, further comprising a heating unit for heating the die unit and the transfer stage, and a temperature control section for controlling the heating unit.

14. The manufacturing apparatus according to claim 10, further comprising a rotation axis direction moving mechanism for moving the transfer stage in a direction of the rotation axis of the die unit.

15. The manufacturing apparatus according to claim 10, further comprising a rotary moving mechanism for rotating the substrate in a plane that is located under the die unit and is parallel with the rotation axis direction of the die unit.

16. The manufacturing apparatus according to claim 10, further comprising at least one alignment mark observation optical device provided in the pressurizing mechanism, for observing at least one alignment mark formed on the substrate.

17. The manufacturing apparatus according to claim 10, further comprising at least one alignment mark observation optical device provided under the substrate, for observing at least one set of a first alignment mark formed on the substrate and a second alignment mark formed on the die unit.

18. A manufacturing apparatus of an optical device, comprising:
   a transfer stage for holding a substrate that is coated with a thin resin film;
   a cylindrical die unit an outer circumferential surface of which is formed with a micro-asperity pattern;
   a pressurizing mechanism for pressing the outer circumferential surface of the die unit against the thin resin film in such a manner that the die unit can rotate about a rotation axis thereof,
   a moving mechanism for moving one of the transfer stage and the die unit;
   an airtight chamber for accommodating at least the transfer stage, the die unit, the pressurizing mechanism, and the moving mechanism; and
   exhausting means for exhausting a gas from the airtight chamber prior to an operation that a micro-asperity pattern is formed on the thin resin film as the die unit rolls on the thin resin film while being pressed against the thin resin film.

19. An optical device comprising:
   a substrate; and
   a thin resin film formed on the substrate, a top surface of the thin resin film being formed with a micro-asperity pattern and an alignment mark that will serve as a positional reference when an optical component is disposed at a prescribed position with respect to the substrate, the micro-asperity pattern and the alignment mark being formed by rolling, on an original resin film, a cylindrical die unit, an outer circumferential surface of which is formed with a micro-asperity pattern, and a portion having an inverted shape of a shape of the alignment mark while pressing the die unit against the original thin resin film.

20. The optical device according to claim 19, wherein the alignment mark has a first portion that allows observation light incident on the alignment mark to go to detecting means and a second portion that does not.

21. The optical device according to claim 20, wherein the second portion changes an optical path of part of the observation light incident on the second portion so that the part of the observation light does not reach the detecting means.

* * * * *